US011996996B2

(12) United States Patent
Shrestha et al.

(10) Patent No.: US 11,996,996 B2
(45) Date of Patent: May 28, 2024

(54) SYSTEM FOR VIEW-ONLY COMMAND CENTER MODE

(71) Applicant: Dell Products L.P., Round Rock, TX (US)

(72) Inventors: Saurav Shrestha, Round Rock, TX (US); Margaret Patton, Austin, TX (US); Carlin Mendonca, Austin, TX (US); Jeffrey M. Lairsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 17/232,447

(22) Filed: Apr. 16, 2021

(65) Prior Publication Data
US 2022/0337496 A1 Oct. 20, 2022

(51) Int. Cl.
*H04L 12/24* (2006.01)
*H04L 12/26* (2006.01)
*H04L 41/28* (2022.01)
*H04L 43/045* (2022.01)
*H04L 43/065* (2022.01)

(52) U.S. Cl.
CPC ............ *H04L 43/045* (2013.01); *H04L 41/28* (2013.01); *H04L 43/065* (2013.01)

(58) Field of Classification Search
CPC . H04L 41/00; H04L 41/04–048; H04L 41/22; H04L 41/28; H04L 43/00; H04L 43/04–06; H04L 43/20
See application file for complete search history.

(56) References Cited

U.S. PATENT DOCUMENTS

| | | | |
|---|---|---|---|
| 7,310,671 B1 * | 12/2007 | Hassell | H04L 41/04 709/224 |
| 9,148,349 B1 | 9/2015 | Burr et al. | |
| 9,471,594 B1 | 10/2016 | Schnegelberger | |
| 9,785,497 B1 | 10/2017 | Cook et al. | |
| 10,530,935 B1 | 1/2020 | Britt et al. | |
| 10,616,072 B1 | 4/2020 | Lo et al. | |
| 10,715,522 B2 | 7/2020 | Lew | |
| 10,819,556 B1 | 10/2020 | Rangasamy et al. | |

(Continued)

OTHER PUBLICATIONS

Tebaldi, What IT Infrastructure Remote Monitoring (NOC) is, OPSERVICES (Year: 2017).*

(Continued)

*Primary Examiner* — Boris D Grijalva Lobos
(74) *Attorney, Agent, or Firm* — Terrile, Cannatti & Chambers, LLP; Stephen A. Terrile

(57) ABSTRACT

A system, method, and computer-readable medium for performing a data center monitoring and management operation. The data center monitoring and management operation includes: entering a data center management mode, the data center management mode enabling a data center administrator user to selectively provide access to a subset of information available for use by the administrator user; determining whether to provide a designated user access to the subset of information; creating a monitoring console instance, the monitoring console instance providing the designated user access to the subset of information; and, enabling the designated user to access the monitoring console instance.

20 Claims, 16 Drawing Sheets

(56) References Cited

U.S. PATENT DOCUMENTS

| | | |
|---|---|---|
| 11,074,730 B1 | 7/2021 | Nunez |
| 2006/0010497 A1 | 1/2006 | O'Brien |
| 2006/0129670 A1 | 6/2006 | Mayer |
| 2010/0313145 A1 | 12/2010 | Dillenberger et al. |
| 2011/0160987 A1 | 6/2011 | Wu et al. |
| 2011/0258143 A1 | 10/2011 | Hilkemeyer et al. |
| 2012/0249588 A1 | 10/2012 | Tison et al. |
| 2013/0031202 A1 | 1/2013 | Mick et al. |
| 2013/0346786 A1 | 12/2013 | Thiel et al. |
| 2014/0006762 A1 | 1/2014 | Bittner et al. |
| 2015/0019705 A1* | 1/2015 | Suryanarayanan ..... H04L 67/08 709/224 |
| 2015/0032887 A1* | 1/2015 | Pesek .................... H04W 12/08 709/224 |
| 2015/0095988 A1* | 4/2015 | Hirakata ............... G06F 16/332 707/800 |
| 2017/0034200 A1 | 2/2017 | Costin et al. |
| 2017/0091607 A1 | 3/2017 | Emeis et al. |
| 2017/0098087 A1 | 4/2017 | Li |
| 2017/0269617 A1 | 9/2017 | Daoud et al. |
| 2017/0269983 A1 | 9/2017 | Liu et al. |
| 2017/0299633 A1* | 10/2017 | Pietrowicz .......... H04L 63/0254 |
| 2017/0330096 A1 | 11/2017 | Das Gupta et al. |
| 2018/0007060 A1 | 1/2018 | Leblang |
| 2018/0032736 A1 | 2/2018 | Inagaki et al. |
| 2018/0108022 A1 | 4/2018 | Bandera et al. |
| 2018/0285750 A1 | 10/2018 | Purushothaman et al. |
| 2018/0337907 A1 | 11/2018 | Bhansali |
| 2019/0035407 A1 | 1/2019 | Keret et al. |
| 2019/0073276 A1 | 3/2019 | Yuen et al. |
| 2019/0158366 A1 | 5/2019 | Higgins et al. |
| 2019/0213306 A1 | 7/2019 | Caselles |
| 2019/0236844 A1 | 8/2019 | Balasian et al. |
| 2019/0394206 A1* | 12/2019 | Zezza ................... H04L 41/045 |
| 2020/0026871 A1 | 1/2020 | Mikhailov et al. |
| 2020/0050861 A1 | 2/2020 | Wexler et al. |
| 2020/0117529 A1 | 4/2020 | Qiao et al. |
| 2020/0117898 A1 | 4/2020 | Tian et al. |
| 2020/0167712 A1 | 5/2020 | Stracquatanio et al. |
| 2020/0169509 A1 | 5/2020 | Tigli |
| 2020/0175165 A1 | 6/2020 | Murphy et al. |
| 2020/0250430 A1 | 8/2020 | Kishore et al. |
| 2020/0250863 A1 | 8/2020 | Shetty et al. |
| 2020/0252276 A1 | 8/2020 | Lairsey et al. |
| 2020/0253079 A1 | 8/2020 | Lairsey et al. |
| 2020/0278901 A1 | 9/2020 | Singh et al. |
| 2020/0329214 A1 | 10/2020 | Ahn et al. |
| 2020/0366671 A1 | 11/2020 | Larson |
| 2021/0019423 A1 | 1/2021 | DuBois et al. |
| 2021/0084119 A1 | 3/2021 | Sheikh |
| 2021/0097058 A1 | 4/2021 | Skiles et al. |
| 2021/0112145 A1 | 4/2021 | Monga et al. |
| 2021/0397182 A1 | 12/2021 | Dundorf et al. |
| 2022/0070050 A1 | 3/2022 | D'Ippolito et al. |
| 2022/0156162 A1 | 5/2022 | Reyes et al. |
| 2022/0172729 A1 | 6/2022 | Mohajer |
| 2022/0199093 A1 | 6/2022 | Ramadas |

OTHER PUBLICATIONS

Daniel McDuff et al., AFFDEX SDK: a Cross-Platform Real-Time Multi-Face Expression Recognition Toolkit, Publication: CHI EA '16: Proceedings of the 2016 CHI Conference Extended Abstracts on Human Factors in Computing Systems, pp. 3723-3726, May 2016, https://doi.org/10.1145/2851581.2890247.

Brittany Herr et al., Analyzing distributed trace data, Pinterest Engineering Blog, Sep. 29, 2017, https://medium.com/pinterest-engineering/analyzing-distributed-trace-data-6aae58919949.

* cited by examiner

SYSTEM FOR VIEW-ONLY COMMAND CENTER MODE

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: entering a data center management mode, the data center management mode enabling a data center administrator user to selectively provide access to a subset of information available for use by the administrator user; determining whether to provide a designated user access to the subset of information; creating a monitoring console instance, the monitoring console instance providing the designated user access to the subset of information; and, enabling the designated user to access the monitoring console instance.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: entering a data center management mode, the data center management mode enabling a data center administrator user to selectively provide access to a subset of information available for use by the administrator user; determining whether to provide a designated user access to the subset of information; creating a monitoring console instance, the monitoring console instance providing the designated user access to the subset of information; and, enabling the designated user to access the monitoring console instance.

In another embodiment the invention relates to a computer-readable storage medium embodying computer program code, the computer program code comprising computer executable instructions configured for: entering a data center management mode, the data center management mode enabling a data center administrator user to selectively provide access to a subset of information available for use by the administrator user; determining whether to provide a designated user access to the subset of information; creating a monitoring console instance, the monitoring console instance providing the designated user access to the subset of information; and, enabling the designated user to access the monitoring console instance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
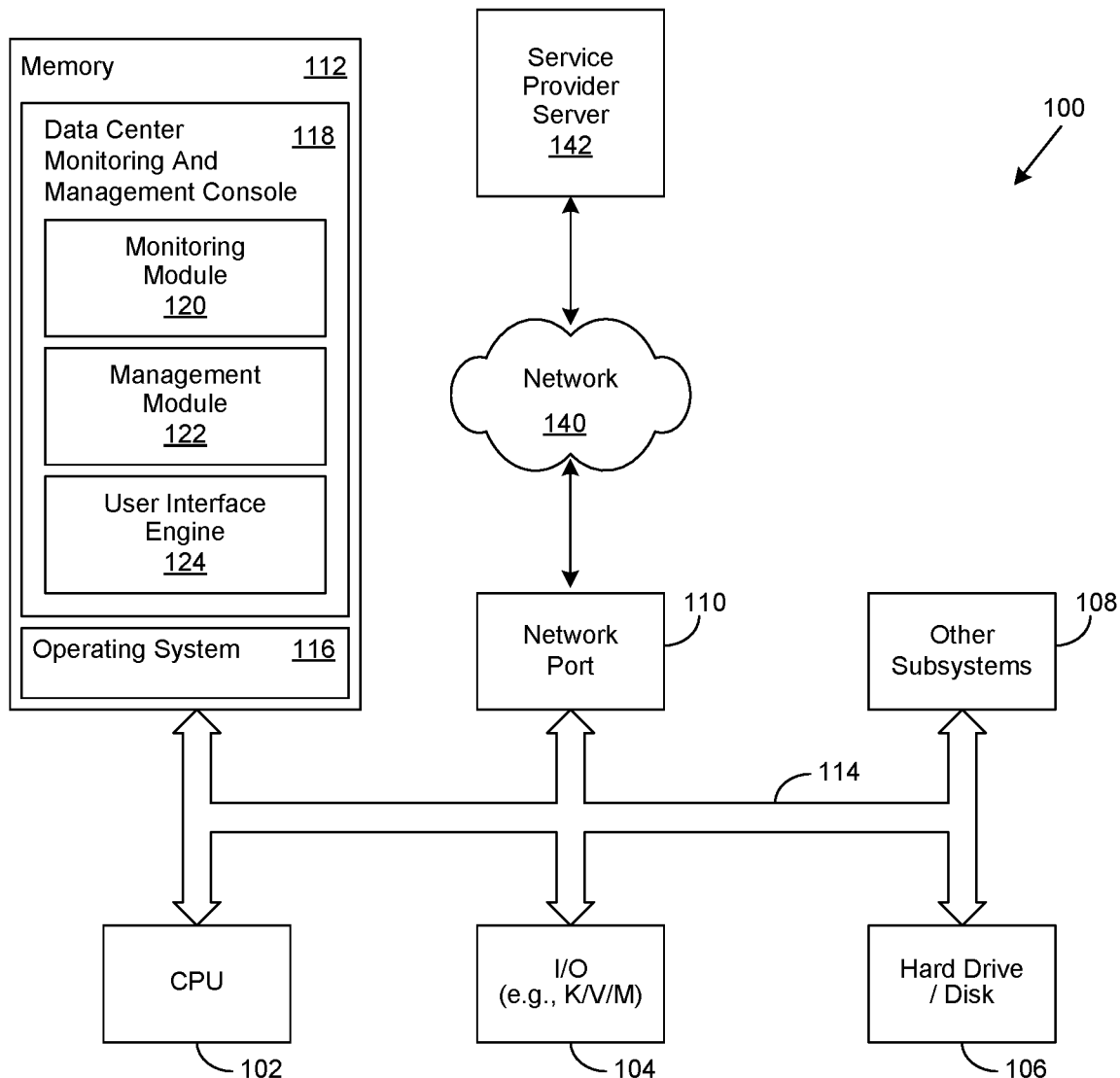
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Various aspects of the invention reflect an appreciation that data center system administrators, beyond their day-to-day monitoring and management duties, often have the additional responsibility of remediating certain data center issues. Certain aspects of the invention likewise reflect an appreciation that the complexity of such remediation responsibilities generally grows in proportion to the number of data center assets that are being monitored and managed. Likewise, certain aspects of the invention reflect an appreciation that quickly remediating data center issues, regardless of how simple or complex they may be, will likely lead to higher quality of service levels and user satisfaction.

Various aspects of the invention reflect an appreciation that it is not unusual for current data center management consoles to log out users after a certain period of inactivity for security reasons. Certain aspects of the invention likewise reflect an appreciation that such a log out event may prevent users from being able to continuously monitor their data center asset environment for issues, since they have no ability to see incoming alerts or changes in asset operational information when they are logged out. Additionally, there may be times when additional users would benefit from access to specific subsets of data center monitoring information, even if they are not regular users of a data center management console. Likewise, certain aspects of the invention reflect an appreciation that while it may be best practice from a security standpoint to block access to a data center management console when a user session is determined to be over, there may be times when speed of access to certain information is more important than confidentiality. As an example, a user may need to receive alert notifications so they can know as soon as possible that something has happened within the data center environment.

Accordingly, certain aspects of the invention reflect an appreciation that it may be advantageous to an organization to be able to monitor the operational status of assets within a data center environment and to detect certain associated data center issue alerts as they occur. Various aspects of the invention likewise reflect an appreciation that the ability to do so will likely result in shorter data center issue remediation intervals, and by extension, lead to higher quality of service levels and user satisfaction.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
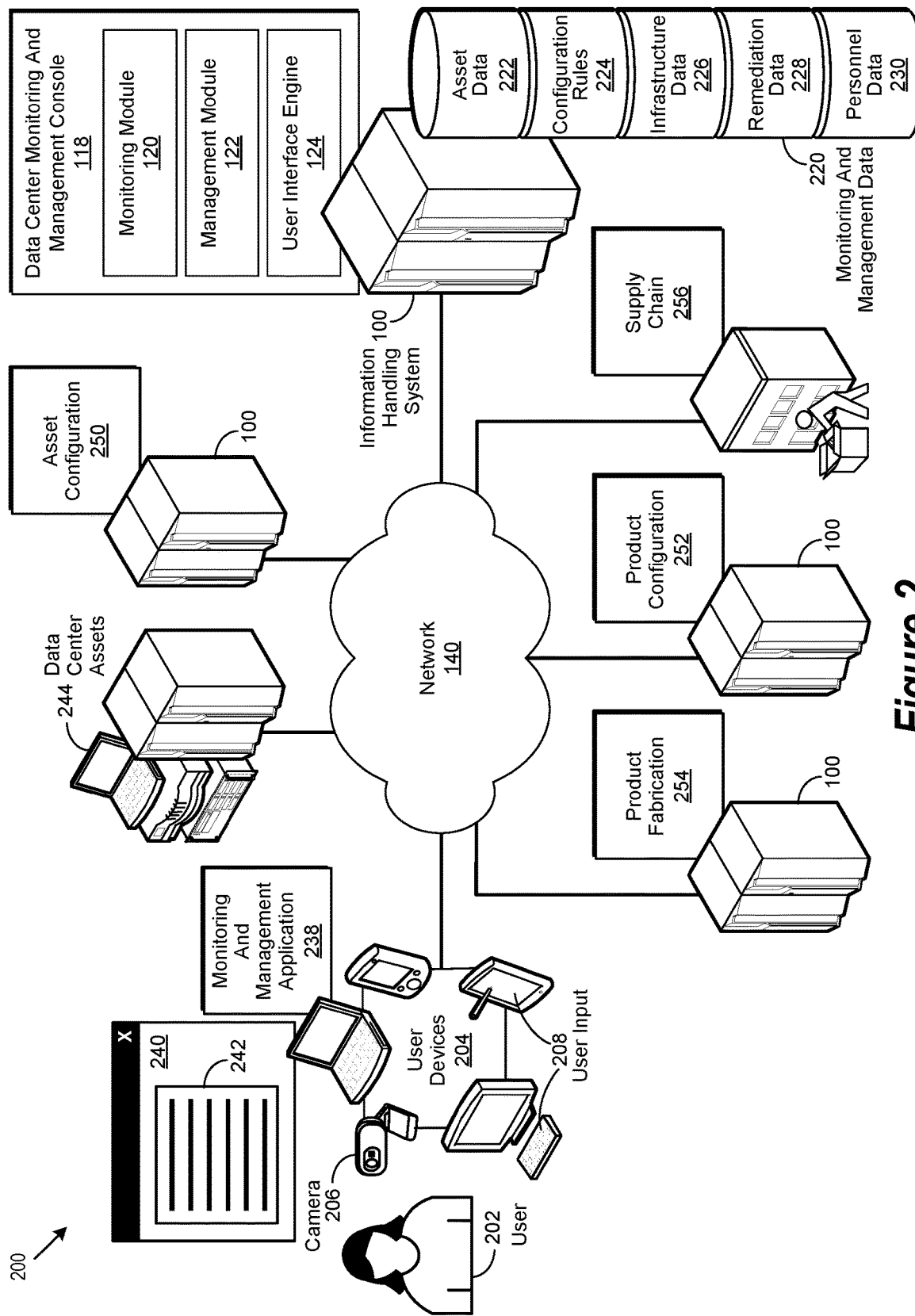
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the selection of such parameters is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, and a user interface (UI) engine 124, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload. In certain embodiments, the data center asset data 224 may include information associated with data center asset 244 types, quantities, locations, use types, optimization types, workloads, performance, support information, and cost factors, or a combination thereof, as described in greater detail herein. In certain embodiments, the data center asset data 224 may include information associated with data center asset 244 utilization patterns, likewise described in greater detail herein.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. Those of skill in the art will recognize that many such examples of data center remediation data 230 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204. such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
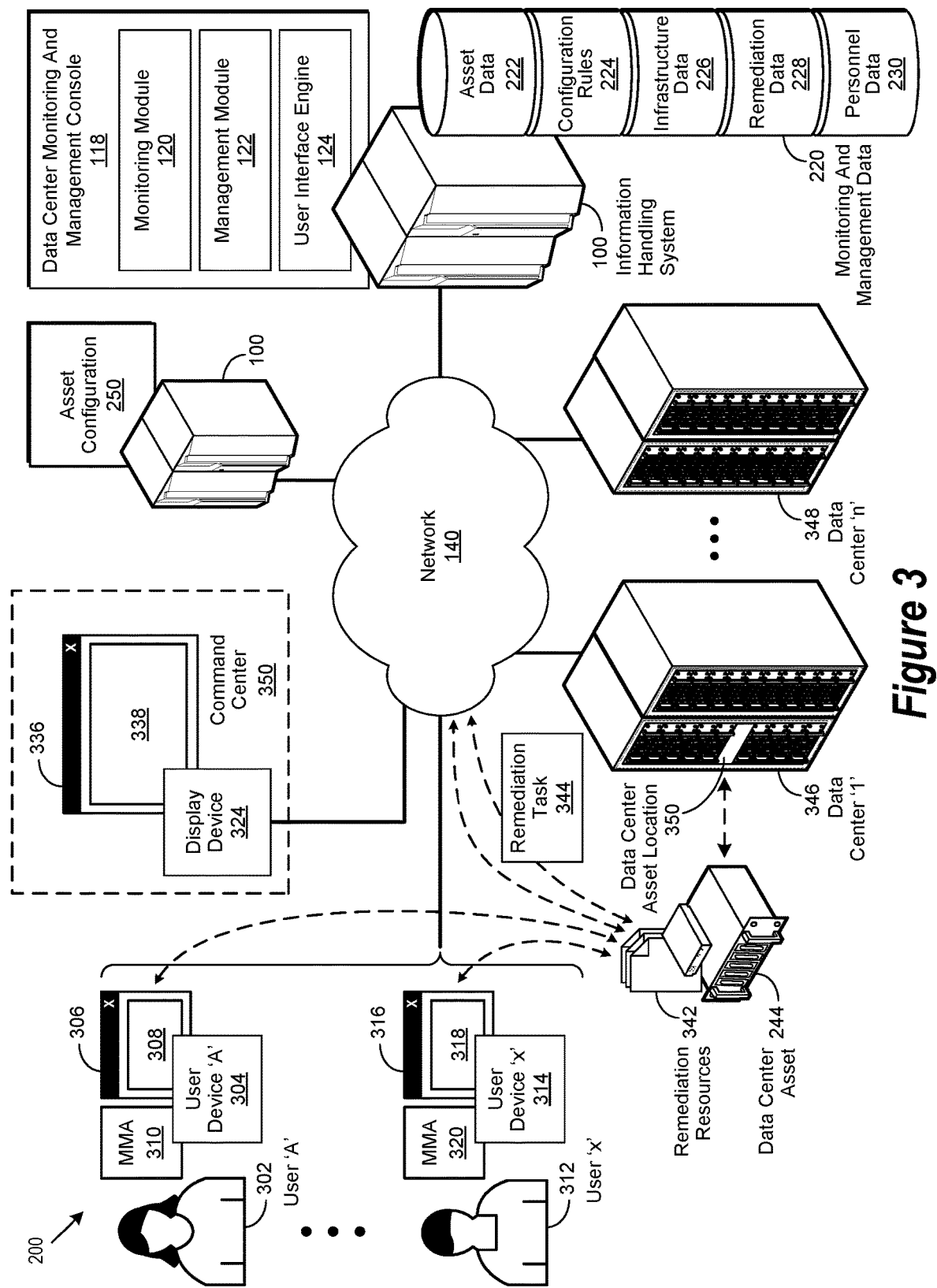
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 350, familiar to those of skill in the art, such as a command center 350 typically found in a data center or a network operations center (NOC). In various embodiments, one or more or the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

Figure 4:
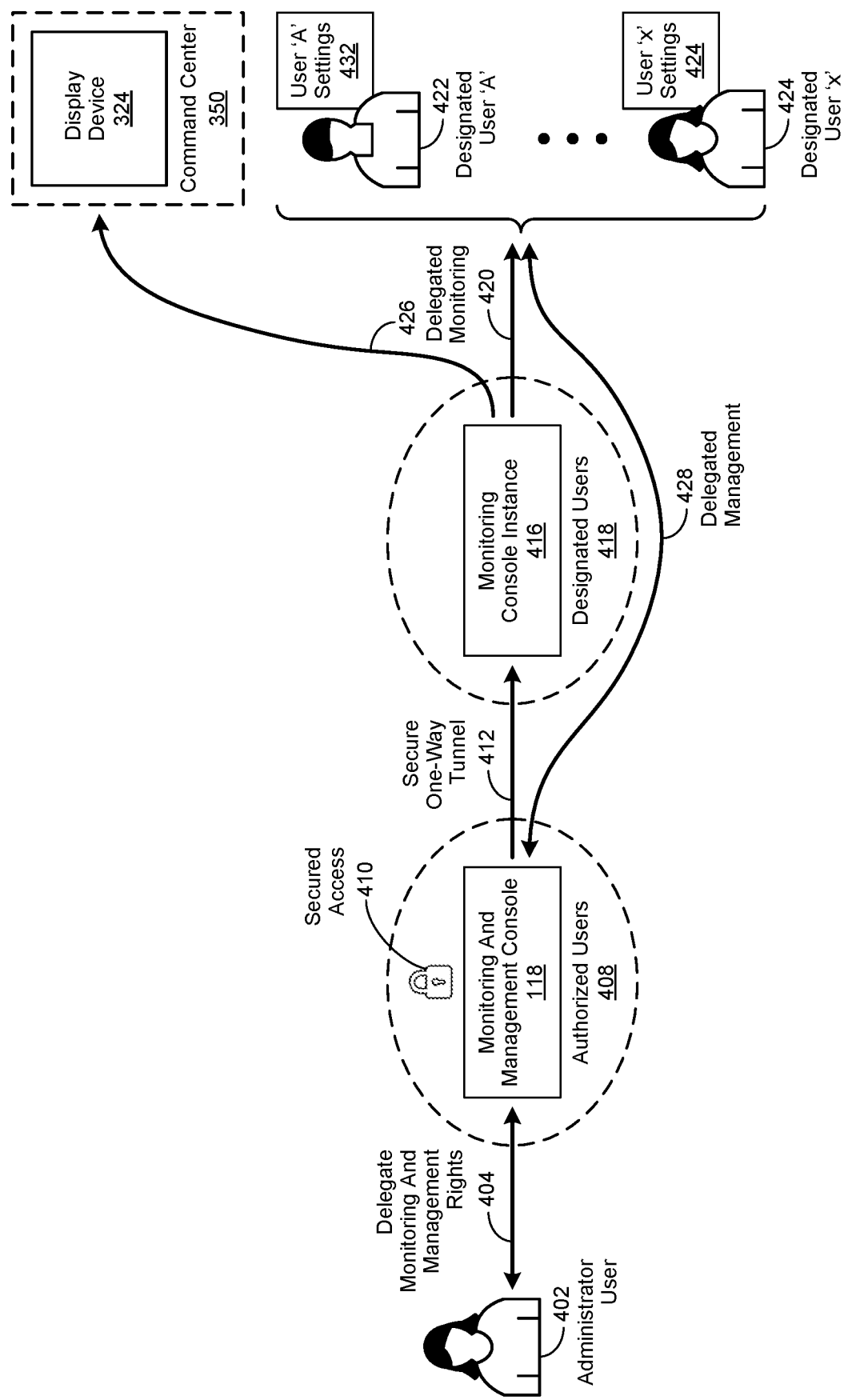
FIG. 4 is a simplified block diagram showing the operation of a data center monitoring console instance.

FIG. 4 is a simplified block diagram showing the operation of a data center monitoring console instance implemented in accordance with an embodiment of the invention. In various embodiments, a replica of a data center monitoring and management console 118, described in greater detail herein, may be implemented as a data center monitoring console instance 416. In various embodiments, the data center monitoring and management console 118 may be implemented to provide certain monitoring information output, or a subset thereof, associated with the operation of a data center monitoring and management environment to the data center monitoring console instance 416. In certain embodiments, such monitoring information output from the data center monitoring and management console 118 may be conveyed to the data center monitoring console instance 416 through the use of a secure, one-way tunnel 412, familiar to skilled practitioners of the art.

In certain embodiments, the data center monitoring and management console 118 may be implemented to operate in a management mode. As used herein, management mode broadly refers to a mode of operation where certain operational functionality of a data center monitoring and management console 118 is available for use by an administrator user 402, or a designated user 418, such as designated users 'A' 422 through 'x' 424 that have been delegated 404 certain console management rights 428 by the administrator user 402. A designated user 418, as used herein, broadly refers to any user that may be authorized to receive certain monitoring information from the data center monitoring console instance 416, or perform certain interactions with the data center monitoring and management console 118.

In certain embodiments, the data center monitoring console instance 416 may be implemented to operate in a monitoring mode. As likewise used herein, monitoring mode broadly refers to a mode of operation where certain monitoring information provided by the monitoring console instance 416, is available for use by one or more designated users 418, such as designated users 'A' 422 through 'x' 424, or a particular data center asset, such as a display device 324, that have respectively been delegated 404 certain monitoring console rights 420, 426 by the administrator user 402. In certain embodiments, one or more of the designated users 'A' 422 through 'x' 424 may be command center 350 users.

In certain embodiments, an administrator user 402 may be authorized 408 to access the data center monitoring and management console 118, and once they have, generate a monitoring console instance 416. In various embodiments, the administrator user 402 may respectively delegate 404, as described in greater detail herein, a particular designated user 'A' 422 through 'x' 424, or a particular data center asset, such as a display device 324, or a combination thereof, the right to perform certain data center monitoring 420, 426 and management 428 operations. In certain embodiments, the data center monitoring console instance 416 may be implemented to only provide a subset of the data center monitoring information output it receives from the data center monitoring and management console 118. For example, the data center monitoring and management console 118 may be capable of providing certain information considered to be sensitive or proprietary. Accordingly, the data center monitoring console instance 416 may be implemented to restrict provision of such information.

In various embodiments, a data center monitoring and management operation may be implemented to include one or more data center monitoring and management console rights delegation operations. As used herein, a data center monitoring and management console rights delegation operation broadly refers to the delegation of certain data center monitoring console instance 416 rights, or certain data center monitoring and management console 118 rights, or a combination of the two, to a a particular designated user 'A' 422 through 'x' 424, or a particular data center asset, such as a display device 324, for a corresponding time duration. As used herein, a time duration broadly refers to a finite amount of time. In certain embodiments, the time duration may have a start date and time and an ending date and time. In certain embodiments, the time duration may be for a finite amount of time, such as 45 minutes, which begins at a particular point in time.

In various embodiments, data center monitoring and management console rights delegation operations may be initiated by an administrator user 402 securely 410 logging in to the data center monitoring and management console 118 in management mode, described in greater detail herein. Various embodiments reflect an appreciation that it is not uncommon for users of a data management system, such as the data center monitoring and management console 118. to be logged out after a certain period of inactivity as a security measure. As an example, a user administrator 402 may be called away unexpectedly and forget to log out, which creates a security vulnerability that could be exploited in the performance of a malicious act. Accordingly, they may be automatically logged out after ten minutes of inactivity.

However, certain embodiments of the invention likewise reflect an appreciation that a user administrator 402 may be inconvenienced as a result of being unexpectedly logged out of the data center monitoring and management consoles 118 as a result of inactivity, even though they are still present. For example, the same user administrator 402 may be monitoring the ongoing operation of certain data center assets, which requires no interaction with the data center monitoring and management console 118, only to be logged out after a certain period of inactivity.

As a result, they have to log in to the data center monitoring and management console 118 again, which might interrupt their monitoring activities. Accordingly, in various embodiments, the administrator user 402 may elect to log in to the data center monitoring and console instance 416 in monitoring mode, as described in greater detail herein. In certain of these embodiments, the administrator user 402 may then continue to monitor the operation of certain data center assets, as described in greater detail herein, and to detect certain associated data center issue alerts, as likewise described in greater detail herein, without interruption.

In certain of these embodiments, the data center monitoring console instance 416 may be implemented to provide the administrator user 402 monitoring output associated with the operation of certain data center assets, and alerts associated with the detection of any corresponding data center issues, on an ongoing basis until the user administrator 402 logs out. To continue the previous example, the administrator user 402 may log in to the data center monitoring console instance 416 to monitor the operation of certain data center assets on an ongoing basis. During the next half hour, no data center issue alerts are detected, but eventually, one is detected that is critical. In this embodiment, the administrator user 402 logs out of the data center monitoring console instance 416 and securely 410 logs in to the data center monitoring and management console 118. Once authenticated as an authorized user 408, the administrator 402 responds to the data center issue alert by performing one or more data center remediation operations, described in greater detail herein.

In various embodiments, the administrator user 402 may perform certain data center monitoring and management console rights delegation administration operations to delegate 404 certain console monitoring rights 420, or certain console management rights 428, or a combination thereof, to a particular designated user 'A' 422 through 'x' 424, for a particular time duration. In certain embodiments, the administrator user 402 may likewise perform certain data center monitoring and management console rights delegation administration operations to delegate 404 certain console monitoring rights 426 to a particular data center asset, such as a display device 324, for a particular time duration. In these embodiments, the data center console monitoring rights 420, 426 that are respectively delegated 404 to a particular designated user 'A' 422 through 'x' 424, or a particular data center asset, may correspond to a particular subset of monitoring information provided by the data center monitoring console instance 416. Likewise, in certain embodiments, the data center console management rights delegated to a particular designated user 'A' 422 through 'x' 424 may correspond to a particular subset of management functionality provided by the data center monitoring and management console 118.

In various embodiments, certain console monitoring rights 420, 426, or certain console management rights 428, may be delegated to a class of designated users 'A' 422 through 'x' 424, or a class of data center assets, such as a display device 324, or a combination thereof. In various embodiments, the delegation of such console monitoring rights 420, 426, or console management rights 428, may be based upon certain attributes associated with a particular designated user 'A' 422 through 'x' 424, or a particular data center asset, or classes thereof. Examples of such attributes may be their name, user ID, title, role, job description, assigned responsibilities, certifications, qualifications, experience, geographical location, position within an organizational structure, functional capabilities, and so forth. Those of skill in the art will recognize that many examples of such attributes are possible. Accordingly, the foregoing is not intended to limit the spirit, scope, or intent of the invention.

In various embodiments, a data center monitoring and management operation may be implemented include one or more delegated data center monitoring and management console rights operations. As used herein, a delegated data center monitoring and management console rights operation broadly refers to any task, function, procedure, or process within a data center monitoring and management environment whose performance can be delegated 404, directly or indirectly, to a particular designated user 'A' 422 through 'x' 424, or a particular data center asset, such as a display device 324, by an administrator user 402. In certain of these embodiments, a particular designated user 'A' 422 through 'x' 424 may receive a notification from an administrator user 402 that certain data center monitoring console instance 416 rights, or certain data center monitoring and management console 118 rights, or a combination of the two, have been delegated 404 to them for a predetermined, finite amount of time.

In various embodiments, the notification may be processed once it is received to determine which data center monitoring console instance 416 rights, or monitoring and management console 118 rights, or a combination of the two, have been delegated 404, and the time duration such delegation is in effect. In these embodiments, the method by which the notification is processed, and the method by which data center monitoring console instance 416 rights, or data center monitoring and management console 118 rights, or a combination of the two, have been delegated, is a matter of design choice. In various embodiments, the monitoring console instance 416 rights may be implemented to delegate 404 certain data center monitoring rights 420 to a particular designated user 'A' 422 through 'x' 424, or to a particular data center asset, such as a display device 324, or a combination thereof. In various embodiments, the data center monitoring and management console 118 rights may likewise be implemented to delegate certain data center management rights 428 to a particular designated user 'A' 422 through 'x' 424. In various embodiments, as described in greater detail herein, the data center monitoring 420 and management 428 rights delegated to a particular designated user 'A' 422 through 'x' 424 may be respectively defined in corresponding user 'A' 432 through 'x' 424 settings.

In various embodiments, a particular designated user 'A' 422 through 'x' 424 may first access the data center monitoring console instance 416, followed by ongoing data center monitoring operations, described in greater detail herein, being performed according to the delegated data center monitoring console rights 420 to monitor the operation of certain data center assets and to detect certain associated data center issue alerts, likewise described in greater detail herein. In various embodiments, detection of such an alert may result in certain data center issue alert description information, data center asset telemetry, configuration, firmware, and other reference information, and information related to with the performance of certain associated data center actions, being collected.

In certain embodiments, a preliminary analysis of a detected alert's associated data center issue may be performed to assign it a data center issue priority level and a remediation difficulty level. In certain embodiments, the prioritization and remediation difficulty levels of a particular data center issue may be established by respectively assigning a data center issue priority level value and a corresponding remediation difficulty level value, such as '1', '2', '3', '4', and '5'. As an example, a particular data center issue may be assigned a priority level value of '1', which is the highest priority, and a remediation difficulty level value of '5', which is the lowest difficulty. In these embodiments, the method by which the prioritization level and remediation difficulty level of a data center issue is determined, the method by which such prioritization and difficulty is characterized and notated, and the method by which it is associated with a particular data center issue, is a matter of design choice.

In certain embodiments, the data center issue alert, the previously-collected data center issue detail information, and its assigned priority level value, may then be presented to a particular designated user 'A' 422 through 'x' 424. In various embodiments, the designated user 'A' 422 through 'n' 424 may have been delegated certain data center issue escalation management rights. In certain of these embodiments, the designated user 'A' 422 through 'x' 424 may first access the data center monitoring and management console 118, and then escalate the prioritization of the data center issue, de-escalate its prioritization, or keep its prioritization the same. In these embodiments, the method by which the designated user 'A' 422 through 'x' 424 is authorized to access the data center monitoring and management console 118, and the method by which they do so upon being authorized, and the method by which they may manage the escalation of a particular data center issue is a matter of design choice.

In certain embodiments, it may be decided to remediate a particular data center issue at the time its priority level and remediation difficulty values have been adjusted. As an example, a data center issue with a priority level value of '4' may be escalated to an adjusted priority level value of '5' as a result of the application of a priority weighting value generated as a result of the reaction of a data center administrator when viewing details of the data center issue. To continue the example, the designated user 'A' 422 through 'x' 424 may elect to assume responsibility for remediating the data center issue based upon its data center issue priority level and remediation level values.

In various embodiments, once the data center issue priority level value and remediation difficulty level value has been associated with its corresponding data center issue, it may then be added to a ranked list of data center issues to be remediated. In certain of these embodiments, individual data center issues may be ranked according to their corresponding data center issue priority level value, their respective remediation difficulty level value, or a combination of the two. In certain embodiments, a particular data center issue may then be selected from the ranked list for remediation at a later time, as described in greater detail herein.

In certain embodiments, the data center issue selected for remediation may then be compared to the same, or substantively similar, data center issues that have been successfully remediated in the past to determine possible data center remediation operations to perform. In various embodiments, information associated with such similar, or substantively similar, data center issues, and the data center remediation operation used to successfully remediate them, may be stored in a repository of data center remediation data, described in greater detail herein. In certain of these embodiments, the data center remediation operation used to successfully remediate the same, or substantively similar, data center issues in the past may be presented in ranked order of their respective efficacy. As an example, those data center remediation operations that are more likely to remediate a particular data center issue may have a higher ranking than those that are less likely to.

In certain embodiments, one or more such data center remediation operations may then be selected. In various embodiments, it may be determined that certain of the data center remediation operations presented for selection may be able to be performed automatically. In certain of these embodiments, those data center remediation operations that may be performed automatically may be respectively presented to the designated user 'A' 422 through 'x' 424. In certain of these embodiments, the designated user 'A' 422 through 'x' 424 may have been delegated the right to perform automated data center remediation operations. If so, then they may elect to do so by first being authorized 408 to securely 410 access the data center monitoring and management console 118, and once they have been, performing the automated data center remediation operation.

In various embodiments, the designated user 'A' 422 through 'x' 424 may have been delegated the right to perform manual data center remediation operations. In certain embodiments, if the qualifications to perform a particular manual data center remediation operation matches the designated user's 'A' 422 through 'x' 424 qualifications, then they may elect to do so. As before, the designated user 'A' 422 through 'x' 424 is first authorized 408 to securely 410 access the data center monitoring and management console 118, and once they have been, they then perform the manual data center remediation operation.

In various embodiments, the qualifications to perform a particular manual data center remediation operation may not match the designated user's 'A' 422 through 'x' 424 qualifications. In certain of these embodiments, a determination may be made regarding relevant data center personnel and remediation resources that may be pertinent to performance of a particular data center remediation operation. In various embodiments, it may be determined that the designated user 'A' 422 through 'x' 424 may not possess the qualifications typically associated with performing a particular data center remediation operation they have selected.

Accordingly, in various embodiments, the designated user 'A' 422 through 'x' 424 may have been delegated the right to assign a remediation task to certain data center personnel. As before, the designated user 'A' 422 through 'x' 424 is first authorized 408 to securely 410 access the data center monitoring and management console 118, and once they have been, they then perform a remediation task assignment operation. In various embodiments, the remediation task assignment may involve generation of an associated data center remediation task, described in greater detail herein. In certain of these embodiments, the remediation task assignment may involve assignment of the resulting remediation task to certain data center personnel.

In various embodiments, a determination may be made regarding the most relevant data center personnel available to perform the selected data center remediation operation. To continue a previous example, a server may have an internal fan that is beginning to fail, and as a result, its operational temperature is beginning to reach an unacceptable level. In this example, the data center remediation operation selected to be performed may involve replacement of the fan. Accordingly, it may be determined that who is needed to perform the data center remediation operation is any data center personnel that is knowledgeable of how to replace the fan, regardless of whether they have done so in the past, or more particularly, have done so for that particular type or model of server. Likewise, it may be determined that what is needed to perform the data center remediation operation is a suitable replacement fan, documentation for the fan and server, and step-by-step instructions on how to replace the fan in that particular server.

In certain embodiments, a ranked list of candidate data center personnel to perform the selected data center remediation operation may be generated. In certain embodiments, the list of candidate data center personnel may be ranked according to particular skills, certifications, knowledge, experience, and so forth, they may individually possess that may be pertinent to performing the selected data center remediation operation. In certain embodiments, one or more of the candidate data center personnel may be selected to assist the designated user 'A' 422 through 'x' 424 in performing one or more data center remediation operations.

In various embodiments, the list of candidate data center personnel may additionally be ranked according to each individual candidate's current workloads, their currently assigned responsibilities, their success rate in remediating a particular type or class of data center issue, the number of such data center issues they have successfully remediated in the past, the average time it may have taken them to successfully remediate the issue, their physical location, the priority level and remediation difficulty level of the data center issue, and so forth. In various embodiments, the data center monitoring and management console 118 may be implemented to track the physical location of certain data center personnel. In various embodiments, certain Global Positioning System (GPS) approaches familiar to those of skill in the art may be used to perform such tracking.

Various embodiments of the invention reflect an appreciation that an organization may desire broadening the knowledge, capabilities, and expertise of certain less-experienced data center personnel involved in the remediation of data center issues. Accordingly, in certain embodiments, an organization may elect to have the most minimally qualified data center personnel remediate a particular data center issue, based upon its data center issue priority level value, or its remediation difficulty value, or a combination of the two. As an example, a particular data center issue may have a data center issue priority level value of '1', indicating that it is of low priority, yet it has a remediation difficulty level value of '5', indicating that it may be very difficult or complicated to remediate. In this example, the data center issue may be considered to be an opportunity for a less-experienced data center administrator or technician to gain knowledge and expertise in resolving a difficult or complicated data center issue without incurring significant risk if its remediation takes longer than anticipated.

As another example, a particular data center issue may have a data center issue priority level value of '5', indicating that it is of very high priority, yet it has a remediation difficulty value of '1', indicating that it may be relatively simple to remediate. In this example, the data center issue may be considered to be inappropriate for a less-experienced data center administrator or technician to remediate, as its high priority may indicate that the data center may incur significant risk if it takes too long to remediate. Accordingly, it may make sense for a more experienced data center administrator or technician to remediate the issue to reduce data center's risk, even though its remediation difficulty may be low.

In certain embodiments, one or more data center personnel may be selected from the ranked list of candidate data center personnel to perform, or assist the designated user 'A' 422 through 'x' 424 in performing, the selected data center remediation operation. In these embodiments, the method by which the one or more personnel is selected from the ranked list of candidate data center personnel is a matter of design choice. In various embodiments, certain rules-based, pattern matching, or machine learning approaches known to those of skill in the art may be used to make the selection. In these embodiments, the rules-based, pattern matching, or machine learning approaches, or a combination thereof, used to make the selection is a matter of design choice.

In certain embodiments, the availability of the selected data center personnel may next be determined, and if they are not available to assist in the performance of the data center remediation operation, then a different candidate is selected, as before. In these embodiments, the selection process may be repeated until the availability of the selected data center personnel has been confirmed. In various embodiments, the data center monitoring and management console 118 may be implemented to identify certain remediation documentation, data center asset files, and other remediation resources needed to perform the data center remediation operation once it has been determined that selected data center personnel are available to perform it. As used herein, a remediation resource broadly refers to any data center asset, whether it is tangible or intangible, as described in greater detail herein, that can be used in the performance of a data center remediation operation, likewise described in greater detail herein.

In certain embodiments, the data center personnel selected to remediate the data center issue may then receive a remediation task assignment notification. In certain embodiments, data center personnel receiving such a remediation task assignment notification may then review its associated remediation task, review any associated data center remediation operation notes, and retrieve any associated remediation resources, including remediation documentation, needed to perform the remediation task.

In various embodiments, details of the selected data center remediation operation is captured and collected at each step of the data center remediation operation as it is performed. In certain of these embodiments, the steps of the data center remediation operation may be captured and collected manually by the data center personnel who performed them, or captured automatically by the data center monitoring and management console 118, or a combination thereof.

In certain embodiments, the designated user 'A' 422 through 'x' 424, or the selected data center personnel, who performed the data center remediation operation, may update the data center remediation operation notes upon completing the remediation task. In various embodiments, certain results and metrics associated with completion of the remediation task may be collected, such as how long the remediation task took to complete, whether any additional data center personnel or remediation resources were required, issues encountered when performing the remediation task, whether it was successfully completed, and so forth. In certain embodiments, the collected results, metrics, and notes may then added to a repository of data center remediation data, described in greater detail herein.

Figure 5A:
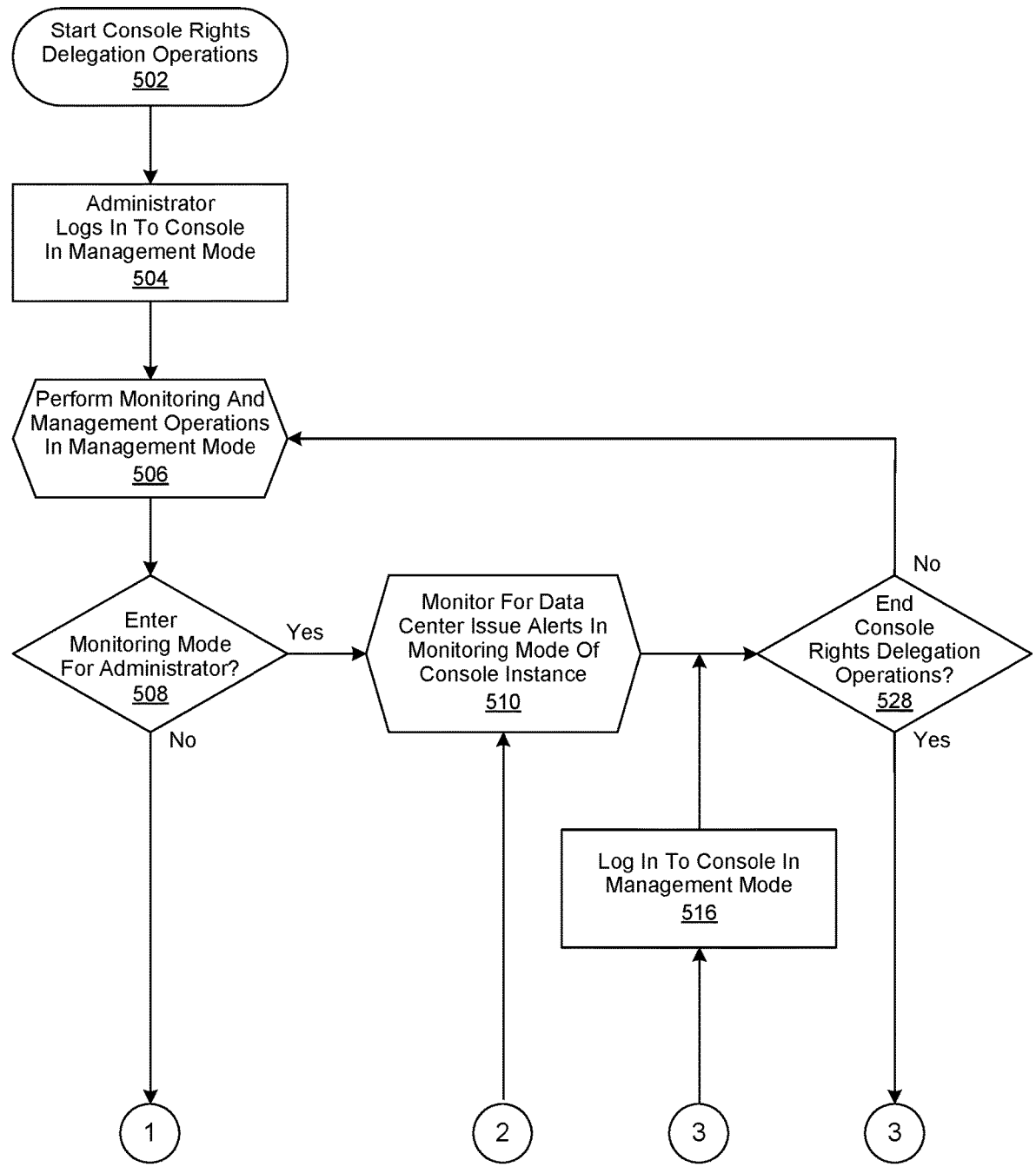
FIGS. 5a and 5b are a flowchart showing the performance of data center monitoring and management console rights delegation.
Figure 5B:
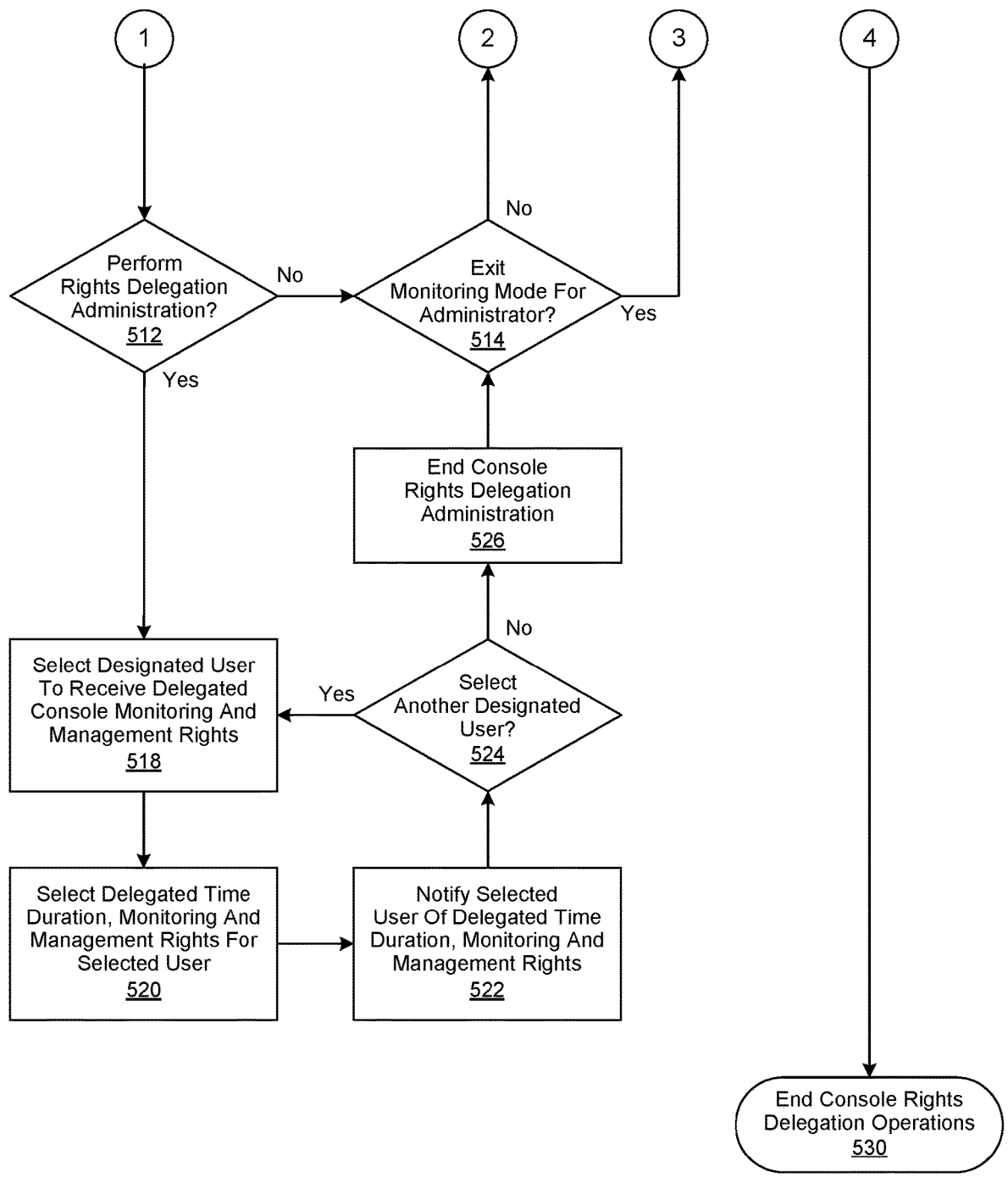
Figure 6A:
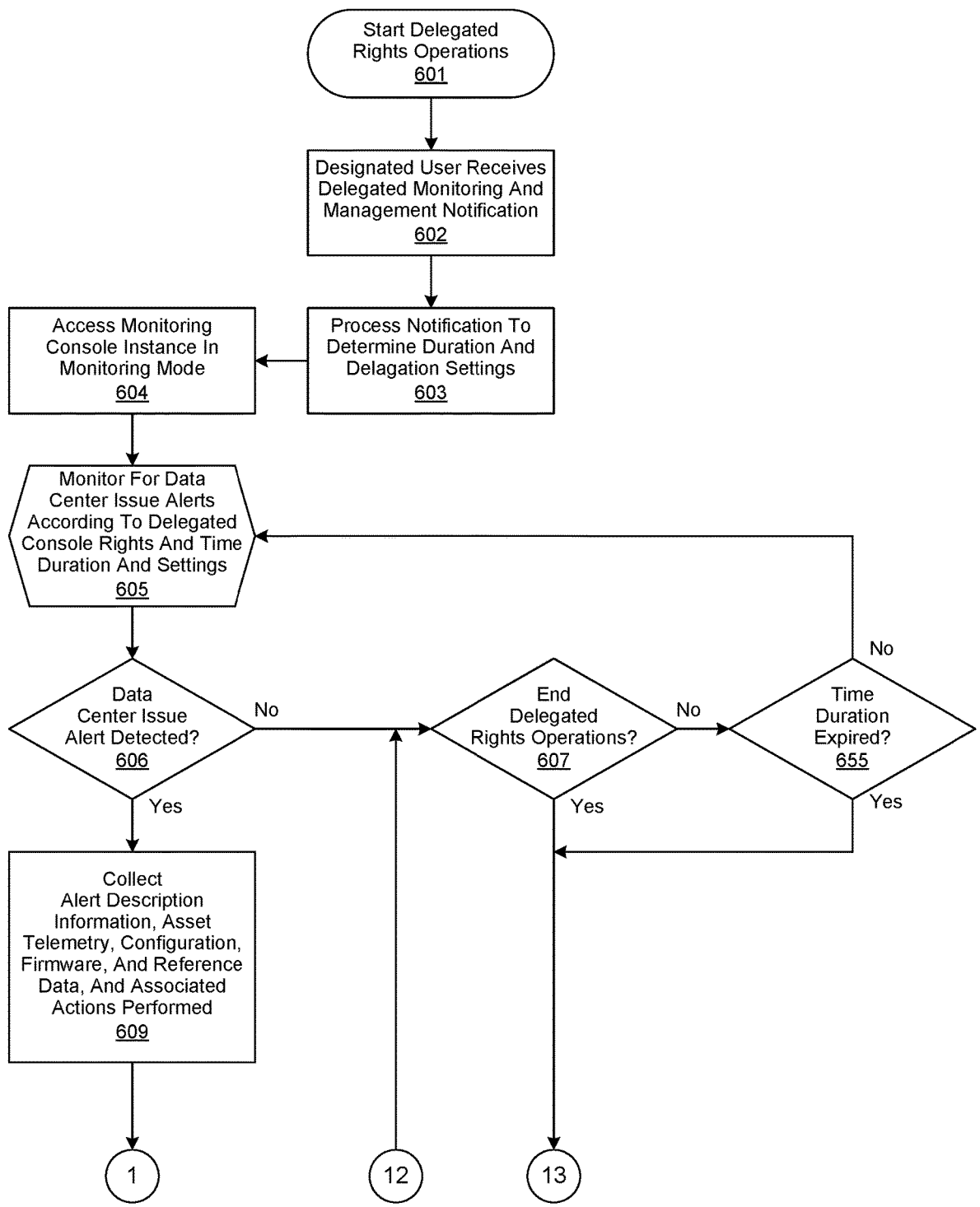
FIGS. 6a through 6f show a flowchart of the performance of delegated data center monitoring and management console rights operations.
Figure 6B:
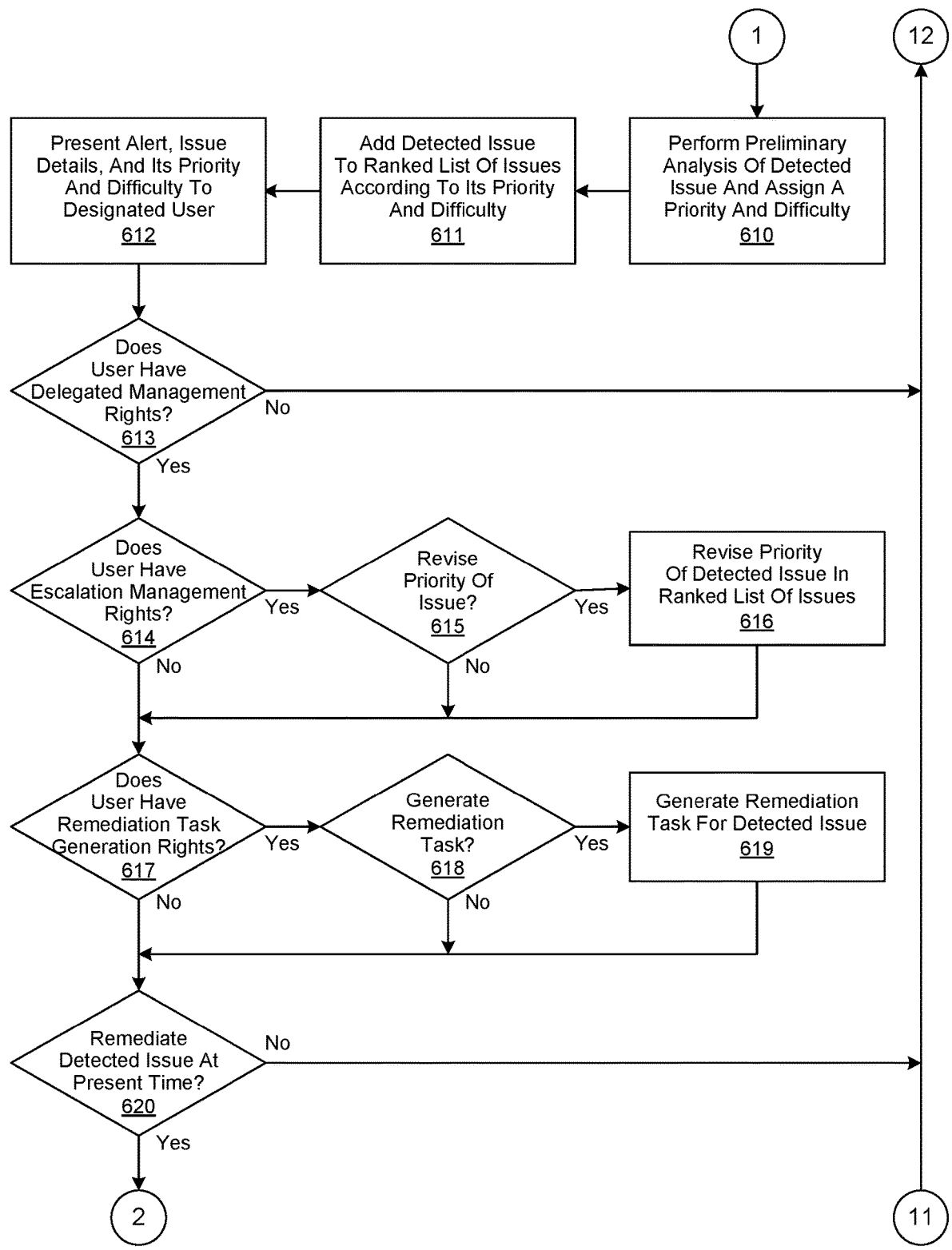
Figure 6C:
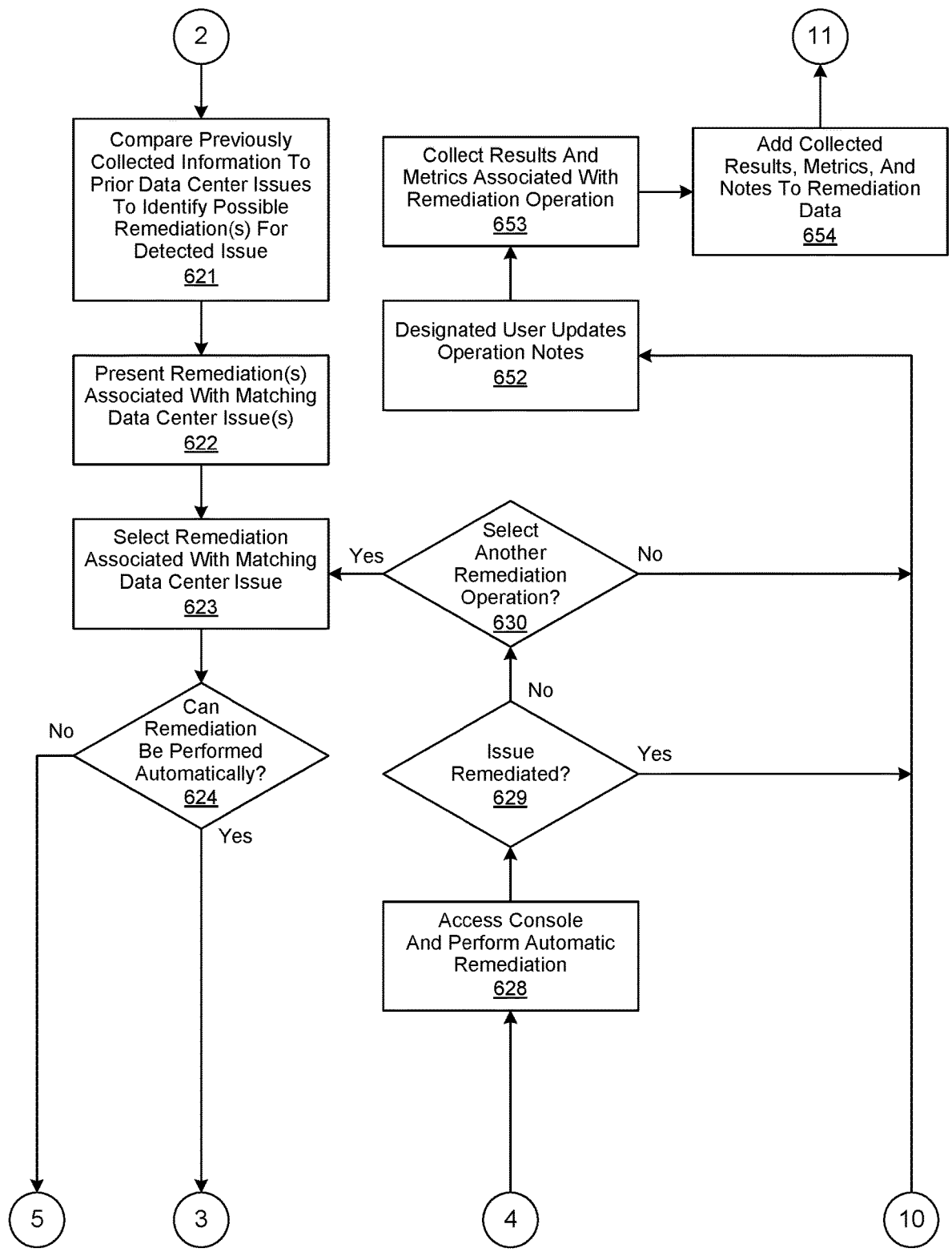
Figure 6D:
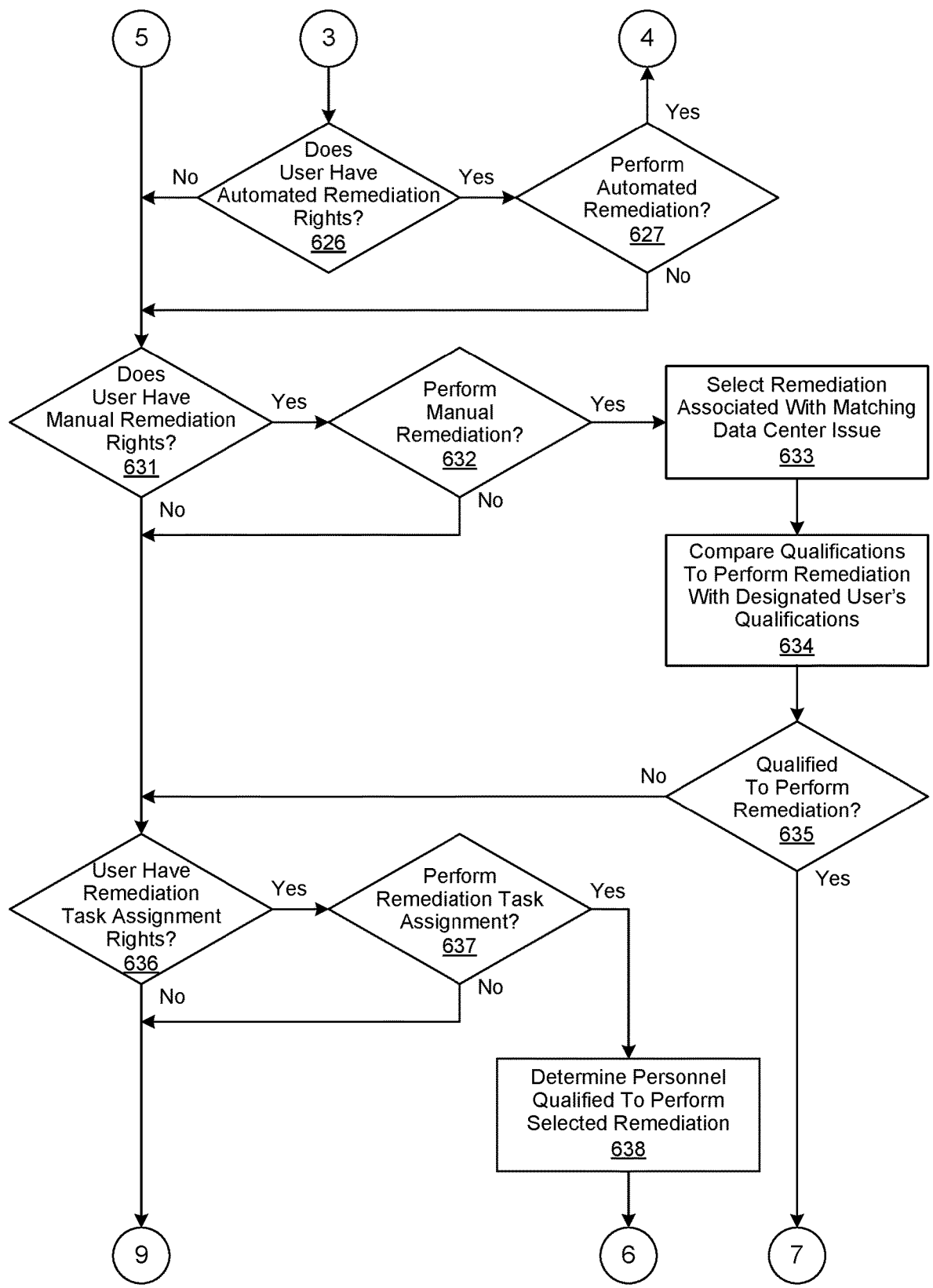
Figure 6E:
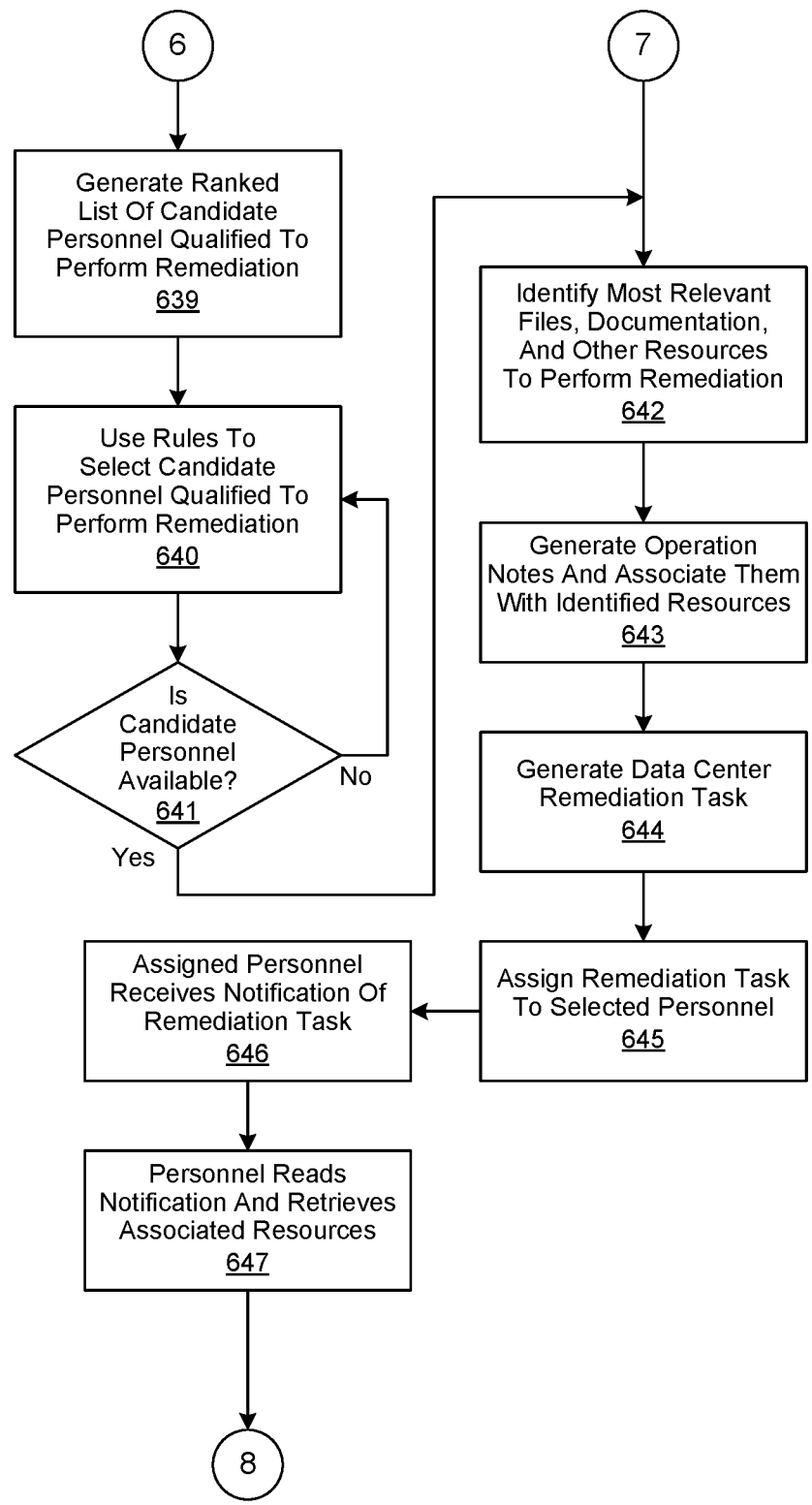
Figure 6F:
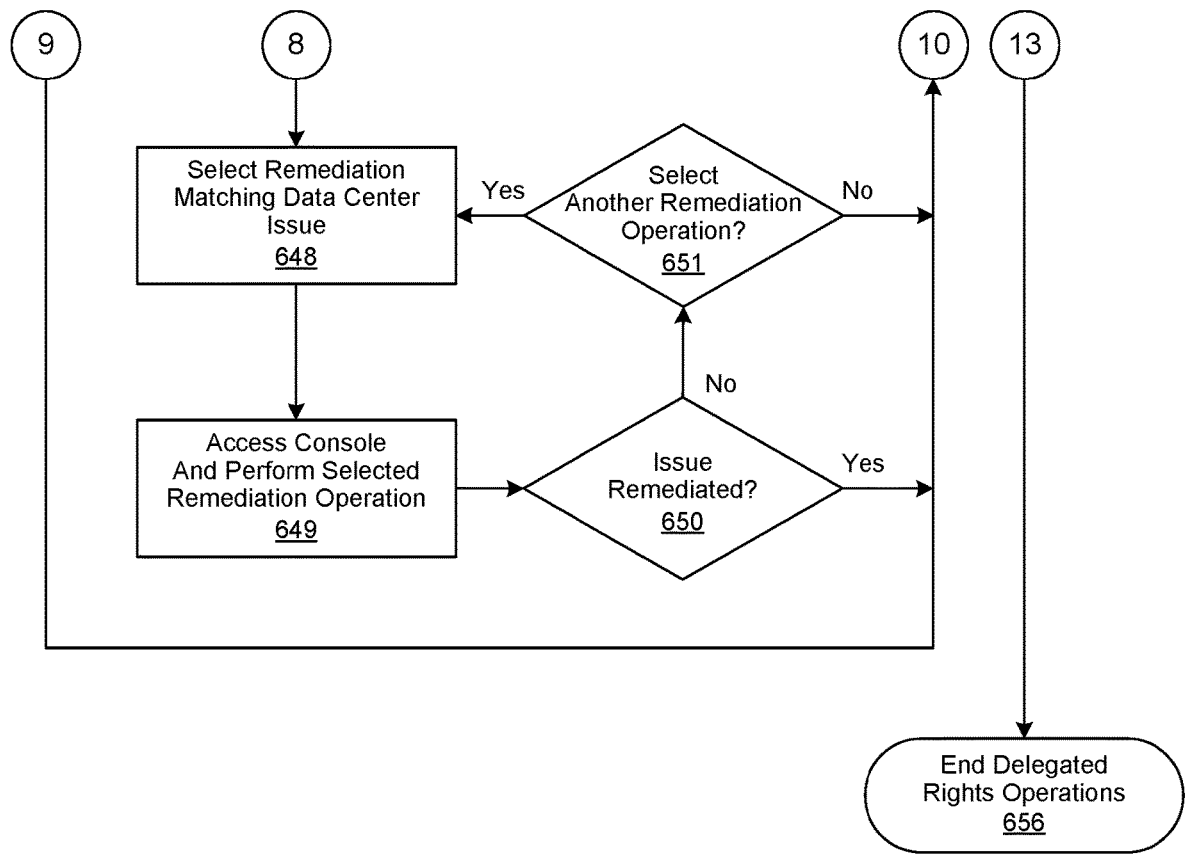

FIGS. 5a and 5b are a flowchart showing the performance of data center monitoring and management console rights delegation operations implemented in accordance with an embodiment of the invention. In this embodiment, data center monitoring and management console rights delegation operations are begun in step 502, followed by a data center administrator logging into a data center monitoring and management console in management mode, as described in greater detail here, in step 504. Ongoing data center monitoring and management operations, likewise described in greater detail herein, are then performed by the data center administrator in step 506. A determination is then made in step 508 whether the data center administrator enters monitoring mode, described in greater detail herein, of a data center monitoring console instance, likewise described in greater detail herein.

If so, then ongoing operations are performed in step 510 to monitor for the occurrence of data center issue alerts while the data center administrator is in monitoring mode of the data center monitoring console instance. A determination is then made in step 528 whether to end data center monitoring and management console rights delegation operations. If not, then the process is continued, proceeding with step 506. Otherwise, data center monitoring and management console rights delegation operations are ended in step 530.

However, if it was determined in step 508 that the data center administrator has entered monitoring mode of the data center monitoring console instance, then a determination is made in step 512 whether to perform data center monitoring and management console rights delegation administration operations. If not, then a determination is made in step 514 whether the data center administrator has exited monitoring mode of the data center monitoring console instance. If not, then the process is continued, proceeding with step 510. Otherwise, the data center administrator logs in to the data center monitoring and management console in management mode in step 516, and the process is continued, proceeding with step 528.

However, if it was decided in step 512 for the data center administrator to perform data center monitoring and management console rights delegation administration operations, then a designated user, described in greater detail herein, is selected in step 518 to receive delegated data center monitoring and management console rights. Thereafter, data center monitoring and management console rights are selected for delegation to the designated user in step 520, as well as a time duration, described in greater detail herein, their delegation will be in effect. The designated user is then notified of their delegated data center monitoring and management console rights, and the time duration such delegation is in effect, in step 522.

A determination is then made in step 524 whether to select another designated user to receive delegated data center monitoring and management console rights. Is so, then the process is continued, proceeding with step 518. Otherwise, then data center monitoring and management console rights delegation administration operations are ended in step 526, and the process is continued, proceeding with step 514.

FIGS. 6a through 6f show a flowchart of the performance of delegated data center monitoring and management console rights operations implemented in accordance with an embodiment of the invention. In this embodiment, delegated data center monitoring and management console rights operations are begun in step 601, followed by a designated user receiving a notification in step 602 that certain data center monitoring and management console rights have been delegated to them. The notification is then processed in step 603 to determine which data center monitoring and management console rights delegated to the designated user, and the time duration such delegation is in effect.

The designated user then accesses a data center monitoring console instance, described in greater detail herein, in step 604, followed by ongoing data center monitoring operations being performed in step 605 according to the delegated data center monitoring console instance rights, and associated time duration, to monitor the operation of certain data center assets and to detect associated data center issue alerts. A determination is then made in step 606 whether a data center issue alert has been detected. If not, then a determination is made in step 607 whether to end delegated data center monitoring and management console rights operations. If not, then a determination is made in step 655 whether the designated users delegated time duration has expired. If not, the process is continued, proceeding with step 605. Otherwise, or if it was determined in step 607 to end delegated data center monitoring and management console rights operations, then delegated data center monitoring and management console rights operations are ended in step 656.

However, if it was determined in step 606 that a data center issue alert was detected, then data center issue alert description information, data center asset telemetry, configuration, firmware, and other reference information, and information related to the performance of certain associated data center actions that have been performed so far, is collected in step 609. A preliminary analysis of the detected issue is then performed in step 610 and it is assigned a priority level value and a remediation difficulty value, such as '1', '2', '3', '4', and '5', where a value of '1' is the highest priority and a value of '5' is the lowest. The detected issue is then added to a ranked list of detected data center issues according to its priority level value and remediation difficulty value in step 611. In step 612, the data center issue alert, the previously-collected data center issue detail information, and its assigned issue priority and remediation difficulty level values, are then presented to the designated user in step 612.

A determination is then made in step 613 whether the designated user has been delegated any data center monitoring and management console rights. If not, then the process is continued, proceeding with step 607. Otherwise, a determination is made in step 614 whether the designated user has been delegated certain data center issue escalation management rights. If so, then a determination is made in step 615 whether to revise the issue priority level value of the detected issue. If so, the issue priority level value of the detected issue is revised in the ranked list of detected data center issues in step 616.

Thereafter, or if it was determined in step 615 not to revise the detected issue's priority value, or if it was determined in step 614 that the designated user has not been delegated escalation management rights, then a determination is made in step 614 whether the designated user has been delegated data center remediation task generation rights. If so, then a determination is made in step 618 to generate a data center remediation task for the detected issue. If so, then one is generated in step 619.

Thereafter, or if it was determined in step 618 not to generate a data center remediation task for the detected issue, or if it was determined in step 617 that the designated used has not been delegated data center remediation task generation rights, then a determination is made in step 620 whether to remediate the detected data center issue at the present time. If not, then the process is continued, proceeding with step 607. Otherwise, then the previously-collected information associated with the detected issue is then compared in step 621 to the same, or substantively similar, issues that have been remediated in the past to identify possible data center remediation operations to perform. One or more data center remediation operations respectively associated with the detected data center issue are presented to the designated user in step 622. A data center remediation operation associated with the matching data center issue is then selected in step 623.

A determination is then made in step 624 whether the selected data center remediation operation can be performed automatically. If so, then a determination is made in step 626 whether the designated user have been delegated the right to perform an automatic data center remediation operation. If so, then a determination is made in step 627 whether to perform the automatic data center remediation operation. If so, then the designated user uses an associated delegated management authorization to access the data center monitoring and management console and performs the selected remediation operation in 628. A determination is then made in step 629 whether the detected data center issue has been remediated. If not, then a determination is made in step 630 whether to select another data center remediation operation. If so, then the process is continued, proceeding with step 623.

Otherwise, or if it was determined in step 629 that the detected data center issue has been remediated, then the designated user updates the data center remediation operation notes, described in greater detail herein, associated with the performance of any data center remediation operation in step 652. Then, in step 653, results of performing the data center remediation operation are collected, along with certain data center remediation operation metrics, likewise described in greater detail herein. The collected results, metrics, notes, and revised priority level value for the data center issue are then added to a repository of data center remediation data in step 654. Thereafter, the process is continued, proceeding with step 607.

However, if it was determined in step 624 that the data center remediation operation selected in step 623 cannot be performed automatically, or in step 626 that the designated user has not been delegated rights to perform automated data center remediation operations, or in step 627 not to perform the automated data center remediation operation, then a determination is made in step 631 whether the designated user has been delegated the right to perform a manual data center remediation operation. If so, then a determination is made in step 632 whether to perform a manual data center remediation operation to remediate the detected data center issue. If so, then a data center remediation operation associated with matching data center issue is selected in step 633. Qualifications associated with performing the selected data center remediation operation is compared to the designated user's qualifications to do so in step 634. A determination is then made in step 635 whether the designated user possesses the qualifications typically associated with performing the selected data center remediation operation.

If not, then a determination is made in step 636 whether the designated user has been delegated data center remediation task assignment rights. If so, then a determination is made in step 637 whether to assign the selected data center remediation task to certain data center personnel to remediate the detected data center issue. If so, then candidate data center personnel qualified to perform the selected data center remediation operation is determined in step 638.

A ranked list of candidate data center personnel to perform the selected data center remediation operations is then generated in step 639, as described in greater detail herein. Rules are then used in step 640, as likewise described in greater detail herein, to select candidate data center personnel to performing the selected data center remediation operation. A determination is then made in step 641 whether the selected candidate personnel are available. If not, then the process is continued, proceeding with step 640.

Otherwise, or if it was determined in step 635 that the designated user possesses the qualifications typically associated with performing the selected data center remediation operation, then the most pertinent remediation documentation, data center asset files, and other remediation resources, for the designated user, or any data center personnel selected to be involved in performing the selected data center remediation operation, is identified in step 642. Thereafter, data center remediation operation notes, described in greater detail herein, are prepared in step 643 and associated with the previously-identified remediation resources needed to perform the selected data center remediation operation. The data center remediation operation notes, and associated remediation resources, are then processed in step 644 by the designated user, or the previously-selected data center personnel, to generate a data center remediation operation task. The resulting data center remediation operation task is then assigned in step 645 to the designated user, or the data center personnel who may have been previously selected to perform the selected data center remediation operations.

The designated user, or the previously-assigned data center personnel, then receives notification of the data center remediation operation task in step 646. Then, in step 647, the designated user, or the previously-assigned data center personnel, reads the notification and its associated data center remediation task and data center remediation operation notes, and retrieves any associated remediation resources, including remediation documentation, they may wish to use to perform the selected data center remediation operation. A data center remediation operation matching the detected data center issue is then selected in step 648. The data center monitoring and management console is then accessed in step 649, as described in greater detail herein, and the selected data center remediation operation is performed.

A determination is then made in step 650 whether performance of the selected data center remediation operation has resulted in the data center issue being remediated. If not, then a determination is made in step 651 whether to select another proposed data center remediation operation. If so, then the process is continued, proceeding with step 648. However, if it was determined in step 650 that the data center issue was remediated, or in step 651 to not select another data center remediation operation, or in step 636 that the designated user has not been delegated data center task remediation rights, or in step 629 that the data center issue has been remediated, or in step 630 not to select another data center remediation operation, then the process is continued, proceeding with step 652.

Figure 7:
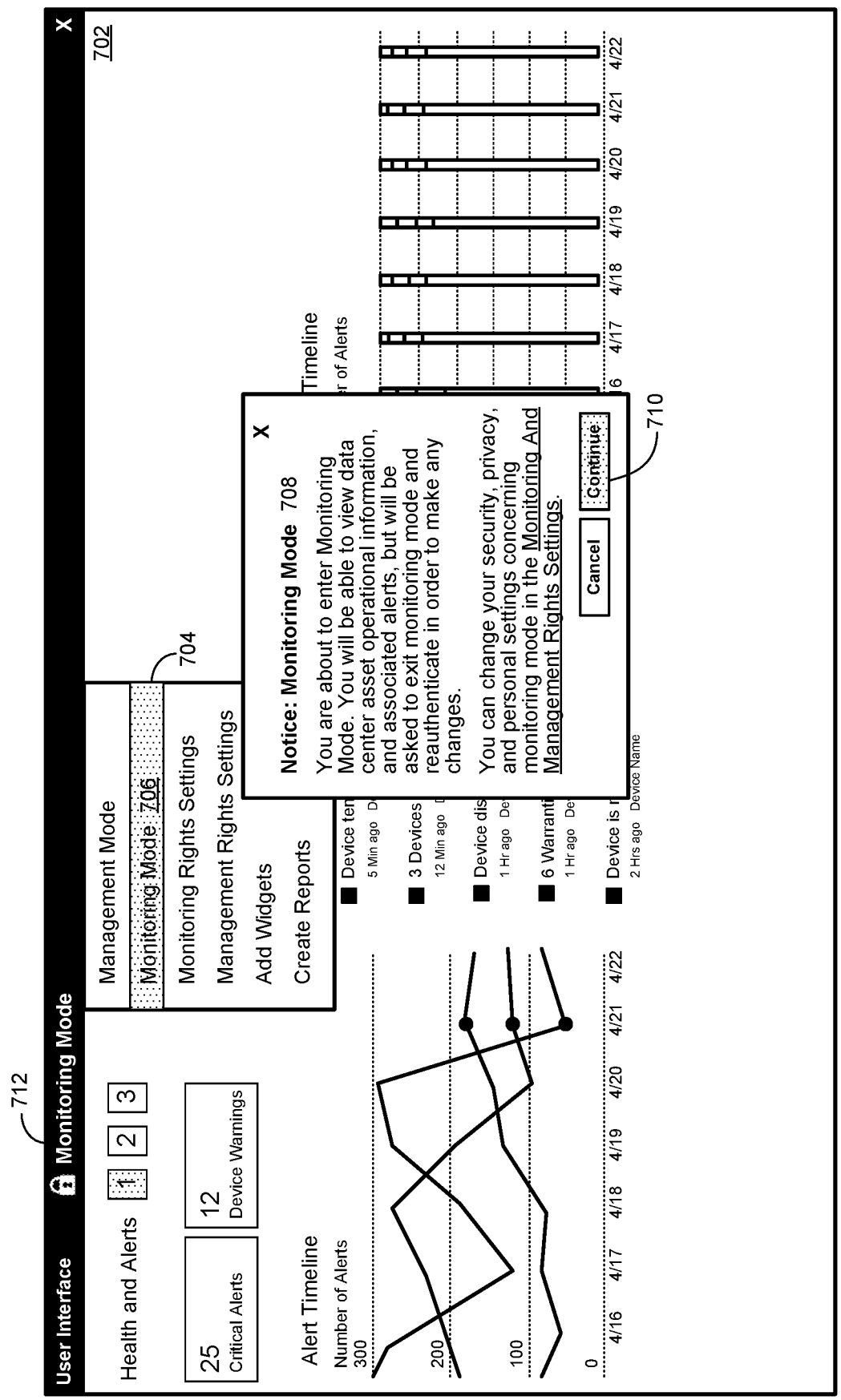
FIG. 7 shows an example screen presentation of a data center monitoring and management console user interface (UI) for entering a monitoring mode of operation.

FIG. 7 shows an example screen presentation of a data center monitoring and management console user interface (UI) implemented in accordance with an embodiment of the invention for entering a monitoring mode of operation. In this embodiment, a data center monitoring and management console UI 702 is implemented to display a drop-down menu 704, where one of the menu selections allows the user to enter a monitoring mode 704, described in greater detail herein. As shown in FIG. 7, selecting the monitoring mode 706 selection on the drop-down menu 704 results in the display of a monitoring mode notification 708. As likewise shown in FIG. 7, selecting the "Continue" 710 command button within the monitoring mode notification 708 results in a monitoring mode status 712 being displayed within the header area of the data center monitoring and management console UI 702.

Figure 8:
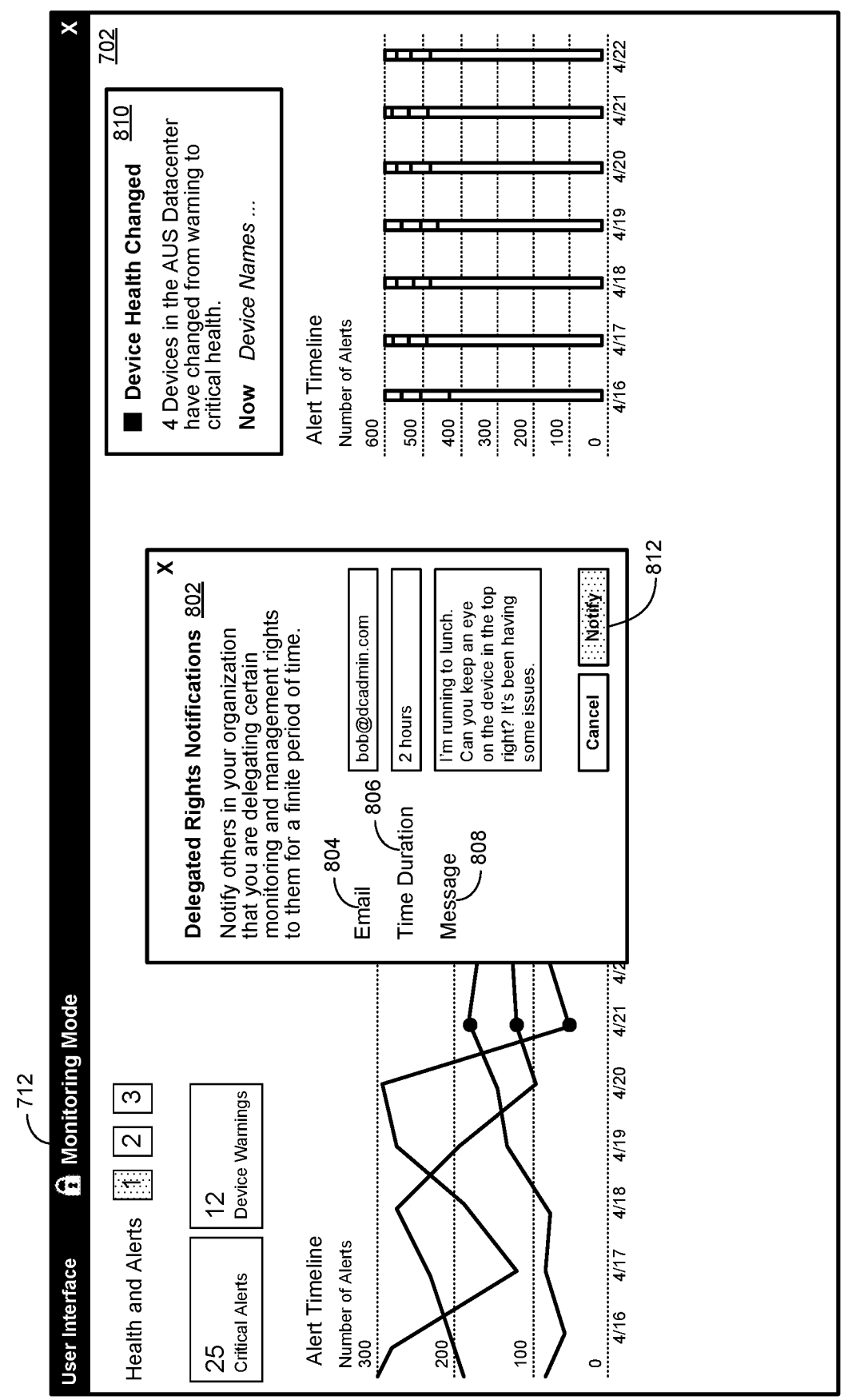
FIG. 8 shows an example screen presentation of a data center monitoring and management console UI for displaying a delegated rights notification to a designated user.

FIG. 8 shows an example screen presentation of a data center monitoring and management console user interface (UI) implemented in accordance with an embodiment of the invention for displaying a delegated rights notification to a designated user. In certain embodiments, as described in greater detail herein, an administrator user may delegate certain data center monitoring and management console rights to a designated user. In certain embodiments, as likewise described in greater detail herein, the designated user may receive a notification of the delegated data center console monitoring and management rights.

In this embodiment, as shown in FIG. 8, the data center monitoring and management console UI 702 is implemented to display a delegated rights notification message window 802. As likewise shown in FIG. 8, the delegated rights notification message window 802 is implemented to include certain data entry fields, such as the designated user's email 804 address, the time duration 806 that the data center console monitoring and management rights are being delegated to them, and an associated message 808. Likewise, as shown in FIG. 8, the delegated rights notification message window 802 is implemented to include a data center asset status window 810 for displaying the current operational status of one or more data center assets. As likewise shown in FIG. 7, selecting the "Notify" 812 command button within the delegated rights notification message window 802 results in the delegated rights notification message being sent to the designated user's email address 804.

Figure 9:
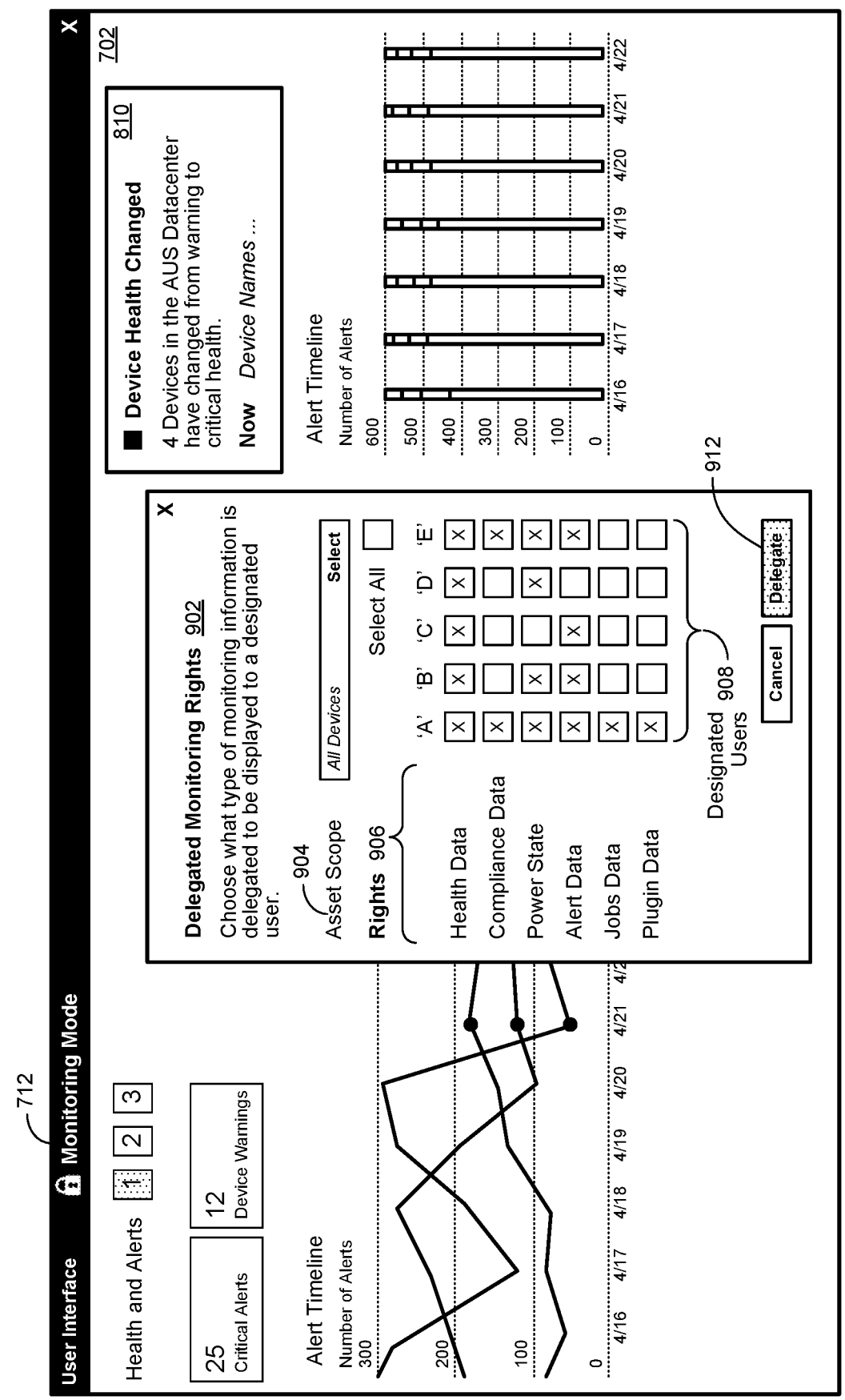
FIG. 9 shows an example screen presentation of a data center monitoring and management console UI for delegating console monitoring rights to a designated user.

FIG. 9 shows an example screen presentation of a data center monitoring and management console user interface (UI) implemented in accordance with an embodiment of the invention for delegating console monitoring rights to a designated user. In certain embodiments, as described in greater detail herein, an administrator user may delegate certain console monitoring rights to a designated user, or a class of designated users. In this embodiment, as shown in FIG. 9, the data center monitoring and management console UI 702 is implemented to display a delegated monitoring rights selection window 902. As likewise shown in FIG. 9, the delegated monitoring rights selection window 902 is implemented to include a data center asset scope 904 selection menu, certain console monitoring rights 906, and certain designated user 908 selection checkboxes.

In certain embodiments, all, or a subset, of the console monitoring rights 906 may be delegated to a particular designated user 908. As an example, all of the console monitoring rights 906 may be delegated to user 'A', while only "Health Data" and "Alert Data" console monitoring rights 906 are delegated to user 'C'. In certain embodiments, all, or a subset, of the console monitoring rights 906 may be delegated to a particular class of designated users 908. As an example, designated user 'A' may refer to a particular class of data center operators, while designated user 'D' may refer to a particular class of data center technicians. As likewise shown in FIG. 9, selecting the "Delegate" 912 command button within the delegated monitoring rights selection window 902 results in the selected console monitoring rights 906 being delegated to their respective designated user, or class of designated user.

Figure 10:
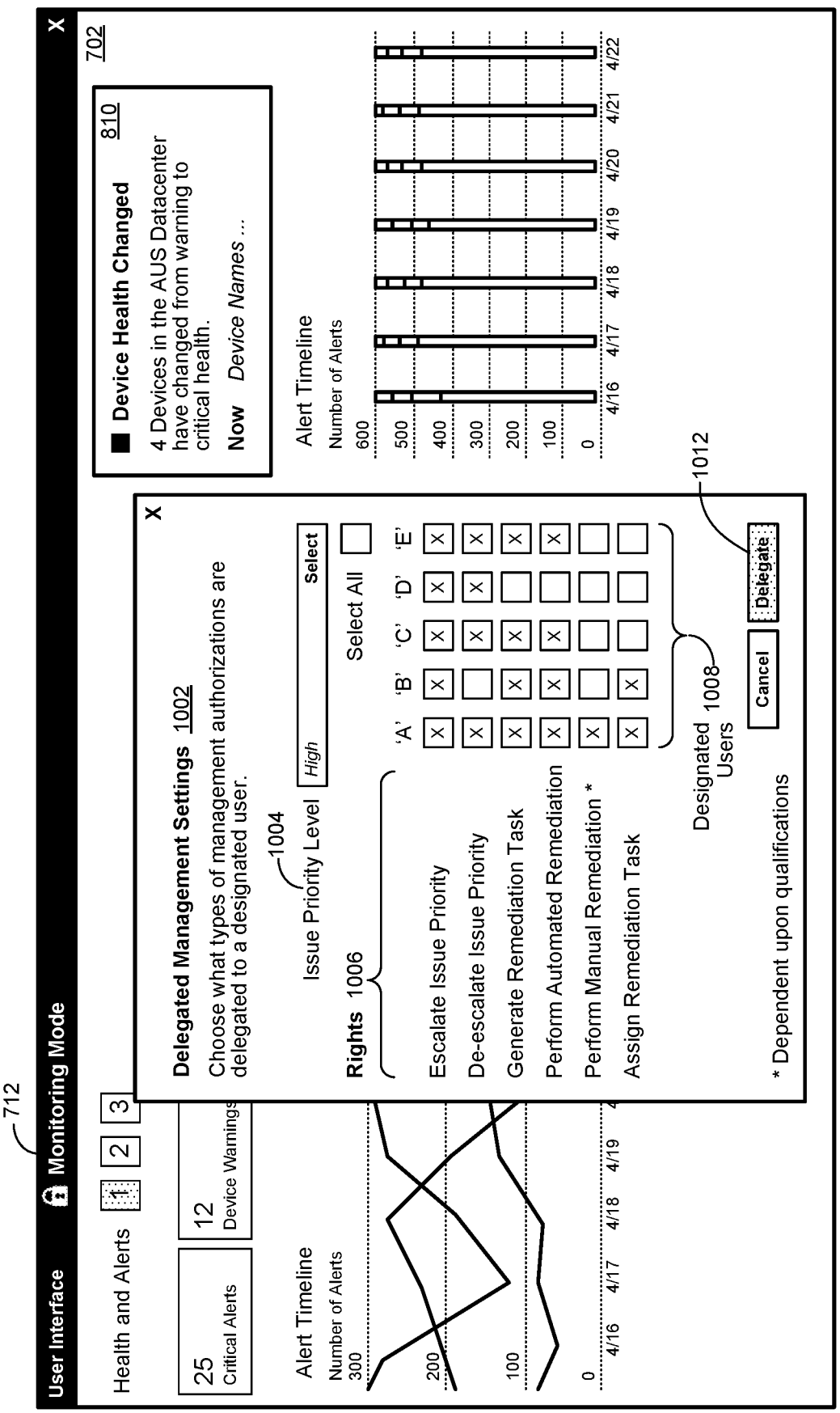
FIG. 10 shows an example screen presentation of a data center monitoring and management console UI for delegating data center console management rights to a designated user.

FIG. 10 shows an example screen presentation of a data center monitoring and management console user interface (UI) implemented in accordance with an embodiment of the invention for delegating data center console management rights to a designated user. In certain embodiments, as described in greater detail herein, an administrator user may delegate certain console management rights to a designated user, or a class of designated users. In this embodiment, as shown in FIG. 10, the data center monitoring and management console UI 702 is implemented to display a delegated management rights selection window 1002. As likewise shown in FIG. 10 the delegated management rights selection window 1002 is implemented to include a data center issue priority 1004 selection menu, certain console management rights 1006, and certain designated user 1008 selection checkboxes.

In certain embodiments, all, or a subset, of the console management rights 1006 may be delegated to a particular designated user 1008. As an example, all of the console management rights 1006 may be delegated to user 'A', while only "Escalate Issue Priority" and "De-escalate Issue Priority" console management 1006 are delegated to user 'D'. In certain embodiments, all, or a subset, of the console management rights 1006 may be delegated to a particular class of designated users 1008. As an example, designated user 'A' may refer to a particular class of data center operators, while designated user 'D' may refer to a particular class of data center technicians. As likewise shown in FIG. 10, selecting the "Delegate" 1012 command button within the delegated management rights selection window 1002 results in the selected console management rights 906 being delegated to their respective designated user, or class of designated user.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    entering a data center management mode via a data center monitoring and management console, the data center monitoring and management console including a monitoring module, a management module and a user interface engine, the monitoring module being implemented to monitor procurement, deployment, implementation, operation, management, maintenance, and remediation of a particular data center asset at any point in a lifecycle of the data center asset, the management module being implemented to manage the procurement, deployment, implementation, operation, monitoring, maintenance, and remediation of the particular data center asset at any point in the lifecycle of the data center asset, the user interface engine being implemented to generate a user interface for the provision, of certain information associated with the monitoring and management of a particular data center asset, the data center management mode enabling a data center administrator user to selectively provide access to a subset of information available for use by the administrator user;
    determining whether to provide a designated user access to the subset of information;
    creating a monitoring console instance via the data center monitoring and management console, the monitoring console instance providing the designated user access to the subset of information, the monitoring console instance being implemented to operate in a monitoring mode of operation, the monitoring mode of operation providing monitoring information for use by the designated user; and,
    enabling the designated user to access the monitoring console instance, the enabling including performing a data center monitoring and management console rights delegation operation, the data center monitoring and management console rights delegation operation delegating certain data center monitoring console instance rights to the designated user.

2. The method of claim 1, wherein:
    the monitoring console instance is created for a corresponding time duration, the corresponding time duration comprising a predetermined finite amount of time.

3. The method of claim 1, further comprising:
    providing a data center management mode user interface; and wherein
    the subset of information is enabled via the data center management mode user interface.

4. The method of claim 1, further comprising:
    enabling delegated user access to the subset of information.

5. The method of claim 1, wherein:
    the designated user comprises at least one of a plurality of command center users; and,
    the monitoring console instance is accessible via a generally viewable command center display device contained within a command center, the generally viewable command center display device being viewable by the plurality of command center users.

6. The method of claim 1, further comprising:
    providing the designated user with remediation task generation rights;
    determining when a data center issue alert is received; and,
    generating a data center remediation task in response to the received data center issue alert, the data center remediation task being generated by the designated user having the remediation task generation rights, the remediation task being designed to address an issue within the data center associated with the data center issue alert, the remediation task comprising an assignment of a data center remediation operation to a selected data center personnel, the selected data center personnel being selected from a set of available data center personnel, the selected data center personnel being the data center personnel most likely to remediate the issue.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        entering a data center management mode via a data center monitoring and management console, the data center monitoring and management console including a monitoring module, a management module and a user interface engine, the monitoring module being implemented to monitor procurement, deployment, implementation, operation, management, maintenance, and remediation of a particular data center asset at any point in a lifecycle of the data center asset, the management module being implemented to manage the procurement, deployment, implementation, operation, monitoring, maintenance, and remediation of the particular data center asset at any point in the lifecycle of the data center asset, the user interface engine being implemented to generate a user interface for the provision, of certain information associated with the monitoring and management of a particular data center asset, the data center management mode enabling a data center administrator user to selectively provide access to a subset of information available for use by the administrator user;

determining whether to provide a designated user access to the subset of information;

creating a monitoring console instance, the monitoring console instance providing the designated user access to the subset of information, the monitoring console instance being implemented to operate in a monitoring mode of operation, the monitoring mode of operation providing monitoring information for use by the designated user; and, enabling the designated user to access the monitoring console instance, the enabling including performing a data center monitoring and management console rights delegation operation, the data center monitoring and management console rights delegation operation delegating certain data center monitoring console instance rights to the designated user.

8. The system of claim 7, wherein:

the monitoring console instance is created for a corresponding time duration, the corresponding time duration comprising a predetermined finite amount of time.

9. The system of claim 8, wherein the instructions executable by the processor are further configured for:

providing a data center management mode user interface; and wherein the subset of information is enabled via the data center management mode user interface.

10. The system of claim 7, wherein the instructions executable by the processor are further configured for:

enabling delegated user access to the subset of information.

11. The system of claim 7, wherein:

the designated user comprises at least one of a plurality of command center users; and, the monitoring console instance is accessible via a generally viewable command center display device contained within a command center, the generally viewable command center display device being viewable by the plurality of command center users.

12. The system of claim 7, wherein the instructions executable by the processor are further configured for:

providing the designated user with remediation task generation rights;

determining when a data center issue alert is received; and, generating a data center remediation task in response to the received data center issue alert, the data center remediation task being generated by the designated user having the remediation task generation rights, the remediation task being designed to address an issue within the data center associated with the data center issue alert, the remediation task comprising an assignment of a data center remediation operation to a selected data center personnel, the selected data center personnel being selected from a set of available data center personnel, the selected data center personnel being the data center personnel most likely to remediate the issue.

13. A non-transitory, computer-readable storage medium embodying computer program code, the computer program code comprising computer executable instructions configured for:

entering a data center management mode via a data center monitoring and management console, the data center monitoring and management console including a monitoring module, a management module and a user interface engine, the monitoring module being implemented to monitor procurement, deployment, implementation, operation, management, maintenance, and remediation of a particular data center asset at any point in a lifecycle of the data center asset, the management module being implemented to manage the procurement, deployment, implementation, operation, monitoring, maintenance, and remediation of the particular data center asset at any point in the lifecycle of the data center asset, the user interface engine being implemented to generate a user interface for the provision, of certain information associated with the monitoring and management of a particular data center asset, the data center management mode enabling a data center administrator user to selectively provide access to a subset of information available for use by the administrator user;

determining whether to provide a designated user access to the subset of information;

creating a monitoring console instance, the monitoring console instance providing the designated user access to the subset of information, the monitoring console instance being implemented to operate in a monitoring mode of operation, the monitoring mode of operation providing monitoring information for use by the designated user; and, enabling the designated user to access the monitoring console instance, the enabling including performing a data center monitoring and management console rights delegation operation, the data center monitoring and management console rights delegation operation delegating certain data center monitoring console instance rights to the designated user.

14. The non-transitory, computer-readable storage medium of claim 13, wherein:

the monitoring console instance is created for a corresponding time duration, the corresponding time duration comprising a predetermined finite amount of time.

15. The non-transitory, computer-readable storage medium of claim 13, wherein the computer executable instructions are further configured for:

providing a data center management mode user interface; and wherein the subset of information is enabled via the data center management mode user interface.

16. The non-transitory, computer-readable storage medium of claim 13, wherein the computer executable instructions are further configured for:

enabling delegated user access to the subset of information.

17. The non-transitory, computer-readable storage medium of claim 13, wherein:

the designated user comprises at least one of a plurality of command center users; and, the monitoring console instance is accessible via a generally viewable command center display device contained within a command center, the generally viewable command center display device being viewable by the plurality of command center users.

18. The non-transitory, computer-readable storage medium of claim 13, wherein the computer executable instructions are further configured for:

providing the designated user with remediation task generation rights;

determining when a data center issue alert is received; and, generating a data center remediation task in response to the received data center issue alert, the data center remediation task being generated by the designated user having the remediation task generation rights, the remediation task being designed to address an issue within the data center associated with the data center issue alert, the remediation task comprising an assignment of a data center remediation operation to a selected data center personnel, the selected data center personnel being selected from a set of available data center personnel, the selected data center personnel being the data center personnel most likely to remediate the issue.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *